US007499595B2

(12) United States Patent  
Chen et al.

(10) Patent No.: US 7,499,595 B2
(45) Date of Patent: Mar. 3, 2009

(54) JOINT AMPLITUDE AND POSITION CODING FOR PHOTOGRAPHIC IMAGE AND VIDEO CODING

(75) Inventors: Wen-hsiung Chen, Sunnyvale, CA (US); Fang Wu, Pleasanton, CA (US); Gregory D. Pelton, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 725 days.

(21) Appl. No.: 11/069,621

(22) Filed: Feb. 28, 2005

(65) Prior Publication Data

US 2006/0039615 A1     Feb. 23, 2006

Related U.S. Application Data

(63) Continuation-in-part of application No. 10/922,508, filed on Aug. 18, 2004, which is a continuation-in-part of application No. 10/922,507, filed on Aug. 18, 2004.

(51) Int. Cl.
    *G06K 9/36*     (2006.01)

(52) U.S. Cl. ..................................... 382/245

(58) Field of Classification Search ................. 382/245
See application file for complete search history.

(56) References Cited

U.S. PATENT DOCUMENTS

| 4,420,771 | A | * | 12/1983 | Pirsch ......................... 341/56 |
| 4,698,672 | A |   | 10/1987 | Chen et al. .................. 358/136 |
| 4,706,265 | A |   | 11/1987 | Furukawa .................. 375/122 |
| 4,725,815 | A | * | 2/1988 | Mitchell et al. ............... 341/67 |

(Continued)

FOREIGN PATENT DOCUMENTS

EP      0 266 049 A2     5/1988

(Continued)

OTHER PUBLICATIONS

G. Cote, B. Erol, M. Gallant, & F. Kossentini, "H.263+: Video Coding at Low Bit Rates" in *IEEE Transactions on Circuits and Systems for Video Technology*, vol. 8, No. 7, Nov. 1998.

(Continued)

*Primary Examiner*—Wenpeng Chen
(74) *Attorney, Agent, or Firm*—Dov Rosenfeld; Inventek

(57) ABSTRACT

A method, apparatus, and carrier medium to encode a series of quantized transform coefficients. The method includes identifying clusters of at least one non-zero-valued coefficients, and for each such cluster, identifying at least one position event that defines the relative position and runlength of the cluster of non-zero coefficients and any intervening run of zero-valued coefficients, and identifying at least one amplitude event to define the amplitudes of the non-zero-valued coefficients in the identified cluster. The method further includes jointly encoding the identified position event or events with the identified amplitude event or events such that relatively short codewords are formed to represent values or sequences of values that are relatively more likely-to-occur, and relatively long codewords are formed to represent values or sequences of values that are relatively less likely-to-occur. The method is applicable to encoding a region in the series where there is likely to be a cluster of non-zero-valued coefficients.

23 Claims, 7 Drawing Sheets

U.S. PATENT DOCUMENTS

| | | | | |
|---|---|---|---|---|
| 4,813,056 | A | 3/1989 | Fedele | 375/27 |
| 4,821,119 | A | 4/1989 | Gharavi | 375/240.16 |
| 4,845,560 | A | 7/1989 | Kondo et al. | 358/133 |
| 4,858,017 | A | 8/1989 | Torbey | 358/426 |
| 4,920,426 | A | 4/1990 | Hatori et al. | 358/433 |
| 4,922,510 | A | 5/1990 | Brusewitz | 375/122 |
| 4,937,573 | A | 6/1990 | Silvio et al. | 341/67 |
| 4,985,700 | A | 1/1991 | Mikami | 341/59 |
| 4,985,766 | A | 1/1991 | Morrison et al. | 358/133 |
| 5,006,930 | A | 4/1991 | Stroppiana et al. | 358/133 |
| 5,045,938 | A | 9/1991 | Sugiyama | 358/133 |
| 5,062,152 | A | 10/1991 | Faulkner | 359/185 |
| 5,086,488 | A | 2/1992 | Kato et al. | 382/56 |
| 5,109,451 | A * | 4/1992 | Aono et al. | 382/166 |
| 5,128,758 | A | 7/1992 | Azadegan et al. | 358/133 |
| 5,136,376 | A | 8/1992 | Yagasaki et al. | 358/133 |
| 5,162,795 | A | 11/1992 | Shirota | 341/67 |
| 5,166,684 | A | 11/1992 | Juri et al. | 341/67 |
| 5,179,442 | A | 1/1993 | Azadegan et al. | 358/133 |
| 5,226,082 | A | 7/1993 | Kustka | 380/46 |
| 5,253,053 | A | 10/1993 | Chu et al. | 358/133 |
| 5,253,055 | A | 10/1993 | Civanlar et al. | 358/133 |
| 5,253,058 | A * | 10/1993 | Gharavi | 375/240.12 |
| 5,291,282 | A | 3/1994 | Nakagawa et al. | 348/384 |
| 5,298,991 | A | 3/1994 | Yagasaki et al. | 348/416 |
| 5,301,032 | A | 4/1994 | Hong et al. | 358/261.2 |
| 5,307,163 | A | 4/1994 | Hatano et al. | 348/415 |
| 5,319,457 | A | 6/1994 | Nakahashi et al. | 348/387 |
| 5,337,087 | A | 8/1994 | Mishima | 348/405 |
| 5,363,097 | A | 11/1994 | Jan | 341/67 |
| 5,371,811 | A | 12/1994 | Morrison et al. | 382/56 |
| 5,400,075 | A | 3/1995 | Savatier | 348/384 |
| 5,402,244 | A | 3/1995 | Kim | 358/261.2 |
| 5,446,744 | A | 8/1995 | Nagasawa et al. | 371/37.4 |
| RE35,093 | E | 11/1995 | Wang et al. | 348/413 |
| 5,475,501 | A | 12/1995 | Yagasaki | 358/426 |
| 5,479,527 | A | 12/1995 | Chen | 382/232 |
| 5,488,367 | A | 1/1996 | Kitamura | 341/106 |
| 5,488,418 | A | 1/1996 | Mishima et al. | 348/398 |
| 5,488,616 | A | 1/1996 | Takishima et al. | 371/30 |
| 5,491,480 | A | 2/1996 | Jan et al. | 341/67 |
| 5,528,628 | A | 6/1996 | Park et al. | 375/240 |
| 5,539,401 | A | 7/1996 | Kumaki et al. | 341/67 |
| 5,640,420 | A | 6/1997 | Jung | 375/240 |
| 5,642,115 | A | 6/1997 | Chen | 341/67 |
| 5,644,305 | A | 7/1997 | Inoue et al. | 341/67 |
| 5,648,774 | A | 7/1997 | Hsieh | 341/67 |
| 5,650,782 | A | 7/1997 | Kim | 341/67 |
| 5,696,558 | A | 12/1997 | Tsukamoto | 348/405 |
| 5,717,394 | A | 2/1998 | Schwartz et al. | 341/51 |
| 5,731,836 | A | 3/1998 | Lee | 348/402 |
| 5,740,283 | A | 4/1998 | Meeker | 382/248 |
| 5,742,342 | A * | 4/1998 | Jung | 375/240.03 |
| 5,751,232 | A | 5/1998 | Inoue et al. | 341/63 |
| 5,767,800 | A | 6/1998 | Machida et al. | 341/67 |
| 5,767,908 | A | 6/1998 | Choi | 348/403 |
| 5,774,594 | A | 6/1998 | Kitamura | 382/239 |
| 5,793,432 | A | 8/1998 | Mishima et al. | 348/423 |
| 5,793,897 | A | 8/1998 | Jo et al. | 382/246 |
| 5,818,877 | A | 10/1998 | Tsai et al. | 375/241 |
| 5,822,463 | A | 10/1998 | Yokose et al. | 382/251 |
| 5,832,130 | A | 11/1998 | Kim | 382/248 |
| 5,844,611 | A | 12/1998 | Hamano et al. | 348/403 |
| 5,852,469 | A | 12/1998 | Nagai et al. | 348/384 |
| 5,883,589 | A | 3/1999 | Takishima et al. | 341/67 |
| 5,923,813 | A | 7/1999 | Okamoto et al. | 386/109 |
| 5,956,153 | A | 9/1999 | Hirabayashi | 358/433 |
| 5,982,437 | A | 11/1999 | Okazaki et al. | 348/413 |
| 5,999,111 | A | 12/1999 | Park et al. | 341/67 |
| 6,014,095 | A | 1/2000 | Yokoyama | 341/67 |
| 6,104,754 | A | 8/2000 | Chujoh et al. | 375/240 |
| 6,111,914 | A | 8/2000 | Bist | 375/240 |
| 6,118,822 | A | 9/2000 | Bist | 375/240 |
| 6,140,944 | A | 10/2000 | Toyoyama | 341/63 |
| 6,144,322 | A | 11/2000 | Sato | 341/67 |
| 6,198,848 | B1 | 3/2001 | Honma et al. | 382/232 |
| 6,215,424 | B1 * | 4/2001 | Cooper | 341/67 |
| 6,218,968 | B1 | 4/2001 | Smeets et al. | 341/65 |
| 6,229,460 | B1 | 5/2001 | Tsai et al. | 341/67 |
| 6,256,064 | B1 | 7/2001 | Chujoh et al. | 348/240.23 |
| 6,278,801 | B1 | 8/2001 | Boon | 382/246 |
| 6,304,607 | B1 | 10/2001 | Talluri et al. | 375/240.27 |
| 6,339,386 | B1 | 1/2002 | Cho | 341/67 |
| 6,388,588 | B2 | 5/2002 | Kitamura | 341/67 |
| 6,404,929 | B1 | 6/2002 | Boon | 382/233 |
| 6,408,029 | B1 | 6/2002 | McVeigh et al. | 375/240.13 |
| 6,445,314 | B1 | 9/2002 | Zhang et al. | 341/67 |
| 6,445,739 | B1 | 9/2002 | Shen et al. | 375/240.03 |
| 6,477,280 | B1 | 11/2002 | Malvar | 382/245 |
| 6,771,828 | B1 | 8/2004 | Malvar | 382/240 |
| 7,203,372 | B1 * | 4/2007 | Chen et al. | 382/244 |
| 7,212,681 | B1 * | 5/2007 | Chen et al. | 382/248 |
| 2004/0228540 | A1 | 11/2004 | Chen et al. | 382/246 |
| 2005/0226513 | A1 * | 10/2005 | Wallace et al. | 382/232 |

FOREIGN PATENT DOCUMENTS

| WO | WO 93/18616 | 9/1993 |
|---|---|---|
| WO | WO 03/090421 | 10/2003 |

OTHER PUBLICATIONS

T. Chujoh & Y. Kikuchi, "An improved variable length coding", *Joint Video Team (JVT) of ISO/IEC MPEG & ITU-T VCEG*, 2nd Meeting: Geneva, CH, Jan. 29-Feb. 1, 2002.

M. Luttrell, J. Wen, H. Yao, and J. Villasen: "Robust Low Bit Rate Wireless Video Communications," Final Report, Project 97-193, University of California MICRO Project, available on http://www.ucop.edu/research/micro/97_98/97_193.pdf Retrieved Dec. 16, 2002.

P.N. Tudor, "MPEG-2 Video Compression", IEE J Langham Thompson Prize, *Electronics & Communication Engineering Journal*, Dec. 1995. Available on http://www.bbc.co.uk/rd/pubs/papers/paper_14/paper_14.html.

"H.264/MPEG-4 AVC Video Compression Tutorial", *VideoLocus*, 2002, available on http://www.videolocus.com.

"MPEG-1 Video Codec", pp. 1-8, available on http://www.cmlab.csie.ntu.edu.tw/cml/dsp/training/coding/mpeg1/ Retrieved Dec. 18, 2002.

K. Takagi, "Reversiblity of Code", *Joint Video Team (JVT) of ISO/IEC MPEG & ITU-T VCEG*, 2nd Meeting: Geneva, CH, Jan. 29-Feb. 1, 2002.

A. Bist, "An Adaptive Quantization Scheme for H.263++", ITU-Telecommunication Standardization Sector q15a49, Working Party 15/1, Expert's Group on Very Low Bitrate Visual Telephony, Portland, Jun. 24-27, 1997.

Reed, E.C. and Lim, J.S. "Efficient Coding of DCT Coefficients by Joint Position-Dependent Encoding." *Proceedings of the 1998 IEEE International Conference on Acoustics, Speech and Signal Processing*, May 12, 1998, pp. 2817-2820, IEEE, New York, NY.

Cheung, K.M. and Kiely, A. "An Efficient Variable Length Coding Scheme for an IID Source." *Proceedings of the Data Compression Conference*, Mar. 28, 1995, pp. 182-191, IEEE Computer Society Press, Los Alamitos, CA.

Simon, S. and De Vriendt, J. "Progressive Image Transmission with Run-Length Coding." *Journal on Communications*, vol. 45, May 1994, pp. 45-50, Budapest, Hungary.

Jeon, B., Park, J. and Jeong, J. "Huffman Coding of DCT Coefficients Using Dynamic Codeword Assignment and Adaptive Codebook Selection." *Signal Processing Image Communication*, vol. 12, No. 3, Jun. 1, 1998, pp. 253-262, Elsevier Science Publishers, Amsterdam, NL.

Chandra, A. and Chakrabarty, K. "Reduction of SOC Test Data Volume, Scan Power and Testing Time Using Alternating Run-length Codes." *Proceedings of the 39th Design Automation Conference*, Jun. 10, 2002, pp. 673-678, ACM, New York, NY.

Taubman, D.S. "Section 2.4.3: Run-Length Coding." *JPEG2000: Image Compression Fundamentals, Standards, and Practice*, 2002, Kluwer Academic Publishers, Dordrecht, NL.

Golomb, S. "Run-Length Encodings." *IEEE Transactions on Information Theory*, vol. 12, No. 3, Jul. 1966, pp. 399-401.

Gallager, R.G. and Van Voorhis, D.C. "Optimal Source Codes for Geometrically Distributed Integer Alphabets." *IEEE Transactions on Information Theory*, vol. IT-21, No. 2, Mar. 1975, pp. 228-230.

* cited by examiner

Table 8: Codes for events of runs of zeroes and non-zeroes follwed by a zero

| Length of preceding zeroes \ Length of non-zero-value cluster | 1 | 2 | 3 | 4 | 5 | 6 | 7 | 8 | 9 | 10 | 11 | 12 |
|---|---|---|---|---|---|---|---|---|---|---|---|---|
| 0 | C(0,1) | C(0,2) | C(0,3) | C(0,4) | C(0,5) | C(0,6) | C(0,7) | C(0,8) | C(0,9) | C(0,10) | C(0,11) | C(0,12) |
| 1 | C(1,1) | C(1,2) | C(1,3) | C(1,4) | C(1,5) | C(1,6) | C(1,7) | C(1,8) | C(1,9) | C(1,10) | C(1,11) | |
| 2 | C(2,1) | C(2,2) | C(2,3) | C(2,4) | C(2,5) | C(2,6) | C(2,7) | C(2,8) | C(2,9) | C(2,10) | | |
| 3 | C(3,1) | C(3,2) | C(3,3) | C(3,4) | C(3,5) | C(3,6) | C(3,7) | C(3,8) | C(3,9) | | | |
| 4 | C(4,1) | C(4,2) | C(4,3) | C(4,4) | C(4,5) | C(4,6) | C(4,7) | C(4,8) | | | | |
| 5 | C(5,1) | C(5,2) | C(5,3) | C(5,4) | C(5,5) | C(5,6) | C(5,7) | | | | | |
| 6 | C(6,1) | C(6,2) | C(6,3) | C(6,4) | C(6,5) | C(6,6) | | | | | | |
| 7 | C(7,1) | C(7,2) | C(7,3) | C(7,4) | C(7,5) | | | | | | | |
| 8 | C(8,1) | C(8,2) | C(8,3) | C(8,4) | | | | | | | | |
| 9 | C(9,1) | C(9,2) | C(9,3) | | | | | | | | | |
| 10 | C(10,1) | C(10,2) | | | | | | | | | | |
| 11 | C(11,1) | | | | | | | | | | | |
| 12 | C(12,0) | | | | | | | | | | | |

FIG. 2

JOINT AMPLITUDE AND POSITION CODING FOR PHOTOGRAPHIC IMAGE AND VIDEO CODING

RELATED PATENT APPLICATIONS

The present invention is related to the following five pending U.S. patent applications, each assigned to the assignee of the present invention, and each incorporated herein by reference, in the manner described, except that the present application does not incorporate by reference any material incorporated by reference in any of these incorporated by reference patent applications and not explicitly incorporated by reference in the present disclosure, e.g., in the following paragraphs.

The present invention is a continuation-in part of U.S. patent application Ser. No. 10/922,508 to inventors Toebes, et al., filed Aug. 18, 2004, titled "TWO-DIMENSIONAL VARIABLE LENGTH CODING OF RUNS OF ZERO AND NON-ZERO TRANSFORM COEFFICIENTS FOR IMAGE COMPRESSION,". Incorporated by reference U.S. patent application Ser. No. 10/922,508 and the methods described therein are each and collectively called the "2-D Non-Zero/Zero Cluster Coding Method" herein.

The present invention is also a continuation-in part of U.S. patent application Ser. No. 10/922,507 to inventors Chen, et al., filed Aug. 18, 2004, titled "VIDEO CODING USING MULTI-DIMENSIONAL AMPLITUDE CODING AND 2-D NON-ZERO/ZERO CLUSTER POSITION CODING,". Incorporated by reference U.S. patent application Ser. No. 10/922,507 and the methods described therein are each and collectively called the "Basic Multi-Dimensional Amplitude Coding Method" herein.

The present invention is related to concurrently filed U.S. patent application Ser. No. 11/069,622 to inventors Chen, et al., filed Feb. 28, 2005, titled "AMPLITUDE CODING FOR CLUSTERED TRANSFORM COEFFICIENTS,". Incorporated by reference U.S. patent application Ser. No. 11/069,622 and the methods described therein are each and collectively called the "Multi-Table Amplitude Coding Method" herein.

The present invention is also related to U.S. patent application Ser. No. 10/898,654 to inventors Chen et al., filed Jul. 22, 2004 and titled "AN EXTENDED HYBRID VARIABLE LENGTH CODING METHOD FOR LOW BIT RATE VIDEO CODING,". Incorporated by reference U.S. patent application Ser. No. 10/898,654, and the methods described therein are each and collectively called the "Extended Hybrid VLC Method" herein.

U.S. patent application Ser. No. 10/898,654 is a continuation in part of, and the present invention is related to U.S. patent application Ser. No. 10/869,229 to inventors Chen et al., filed Jun. 15, 2004 and titled "A HYBRID VARIABLE LENGTH CODING METHOD FOR LOW BIT RATE VIDEO CODING,". Incorporated by reference U.S. patent application Ser. No. 10/869,229 and the methods described therein are each and collectively called the "Basic Hybrid VLC Method" herein.

BACKGROUND

The present invention is related to image compression and video coding, in particular to variable length coding of an ordered series of quantized transform coefficients of a transform of a block of image data.

Two-dimensional variable length coding, referred to as 2D-VLC, has been widely used to code quantized transform coefficients. In traditional 2D-VLC, statistics are collected or assumed of events that include a run of consecutive zero-valued coefficients followed by a single non-zero amplitude coefficient that follows the run length. The ordering of the series of quantized transform coefficients is along a pre-selected path, e.g., a zig-zag path, in the two-dimensional path of the transform. Thus, in a typical implementation, a two-dimensional table consisting of the ending amplitude and the run-length of the preceding consecutive zero-valued coefficients is constructed and variable length codes, such as optimal Huffman codes or arithmetic codes, are assigned according to the assumed or measured statistics to form the 2D-VLC table for the subsequent encoding process. Shorter code lengths are used for the more likely-to-occur, e.g., more frequently occurring events.

2D-VLC is used in common transform coding methods, such as JPEG, MPEG1, MPEG2, ITU-T-261, etc., as follows. For motion video, an image is divided into blocks, e.g., 8 by 8 or 16 by 16 blocks. Each image is classified as interframe or intraframe. Interframe images are typically post motion compensation. The blocks of the image are transformed and the transform coefficients are quantized. The quantized transform coefficients are then coded along a specified path according to a 2D-VLC table. Interframe and intraframe images typically have different 2D-VLC tables. The DC component is typically separately encoded. Furthermore, the 2D-VLC table may be truncated so that the least frequently occurring events use an escape code followed by a fixed length code. A special "EOB" code is used to indicate the end of the block when all remaining coefficients are zero.

One advantage of traditional 2D-VLC is that the position of each non-zero-valued quantized coefficient and its amplitude are coded simultaneously, which generally results in shorter code lengths than using a separate code, e.g., a VLC code for each non-zero-valued coefficient and coefficient amplitude.

Because of the widespread use of image coding, many patents have been issued on different forms of VLC. U.S. Pat. No. 4,698,672 issued Oct. 6, 1987 to Wen-hsiung Chen, one of the inventors of the present invention, for example, described one form of a two-dimensional variable length coding method.

One deficiency of 2D-VLC is that every non-zero-valued coefficient needs to be accompanied by a runlength code to identify its position, in the form of the number of preceding zero-valued coefficients.

In block based transform coding, there often is a region, e.g., a low-frequency region along the ordering in which non-zero-valued coefficients tend to cluster, i.e., there are often a number of consecutive non-zero-valued coefficients along the low frequency region of the pre-determined path. Each one of a number of such consecutive non-zero-valued coefficients would require the same number of codewords representing the position and amplitude.

U.S. patent application Ser. No. 10/342,537 to inventors Chen et al., filed Jan. 15, 2003 and titled AN EXTENSION OF TWO-DIMENSIONAL VARIABLE LENGTH CODING FOR IMAGE COMPRESSION describes a method called the "Extended 2D-VLC Method" herein that includes encoding repetitions of some non-zero coefficient values. One variant of the Extended 2D-VLC method provides codes for all the possible amplitude variations of consecutive coefficients that follow a set of zero-valued coefficients. This effectively reduced the runlength to 1 for all cases. The difficulty of this approach is that there are enormous numbers of patterns that can be generated from the amplitudes of consecutive coefficients. For example, with 32 quantization levels as defined in many common video coding standards, there are in the order of 32" patterns that can be generated from n consecutive coefficients. As such, in a practical implementation, only a limited number of the most likely-to-occur non-zero amplitude values, such as 1 and 2, and a limited number of lengths of consecutive non-zero-values, such as 3 or 4 consecutive values, are regrouped for pattern matching.

Furthermore, in coding, while there may be a region where there are clusters of non-zero-valued coefficients, there is also likely to be a high frequency region where any non-zero-valued coefficients are likely to be scattered.

With these observation in mind, the Basic Hybrid VLC Method of above-mentioned incorporated by reference U.S. patent application Ser. No. 10/869,229 to inventors Chen et al. was developed to encode the position and amplitude of quantized transform coefficients separately and takes advantage of the nature of the distribution of the transform coefficients in the low frequency and high frequency regions.

The Extended Hybrid VLC Method of incorporated by reference U.S. patent application Ser. No. 10/898,654 provides an alternative coding method for the high frequency region by taking advantage of the very few amplitude values in the high frequency region, especially, for example, for low bit rate and interframe applications.

In one embodiment of the above-mentioned Basic Hybrid VLC Method, two independent types of coding schemes are introduced to code the quantized coefficients along the path. A boundary is established along the path to define two regions, e.g., a low frequency region and a high frequency region. The boundary can be made adaptive to the video depending on a number of factors such as intraframe coding or interframe coding, standard definition television (SDTV) or high definition television (HDTV), complex scene or simple scene, high bit rate coding or low bit rate coding, and so forth. In one embodiment, the encoding of the quantized coefficients in the low-frequency region includes coding the positions of consecutive non-zero-valued coefficients and the positions of consecutive zero-valued coefficients using a run-length coding method of a first type and a run-length coding method of a second type. The encoding further includes coding the amplitude values and sign of the non-zero-valued coefficients. In the high-frequency region, in one embodiment, the encoding of coefficients in the high frequency region includes encoding the positions of either no consecutive zero-valued coefficients or runs of one or more consecutive zero-valued coefficients using a run-length coding method of a third type. The encoding further includes coding the amplitude values and sign of the non-zero-valued coefficients.

In one embodiment of the above-mentioned Extended Hybrid VLC Method, a coding method is used in the second region that takes into account that almost all non-zero-valued coefficients in the high frequency region are ±1. No amplitude coding is needed to encode runs of consecutive zeroes that end in a coefficient of amplitude 1. An exception (escape) code is included to encode those rare non-zero-valued coefficients that have values other than ±1.

In the Basic Hybrid VLC Method and the Extended Hybrid VLC Method, the consecutive non-zero-valued coefficients and the consecutive zero-valued coefficients in the low frequency region are coded alternatively using two independent one-dimensional variable length coding methods, e.g., using two independent one-dimensional VLC tables. An observation was made that an improvement in coding efficiency can further be achieved by pairing the consecutive non-zero-valued coefficients and zero-valued coefficients as a pair and applying a single two-dimensional table to code the pair. With this observation, the 2-D Non-Zero/Zero Cluster Coding Method of above-mentioned incorporated by reference U.S. patent application Ser. No. 10/922,508 was introduced to improve the coding efficiency, for example for the low frequency region, and in other embodiments for more than the low frequency region.

In one embodiment of the 2-D Non-Zero/Zero Cluster Coding Method, a method includes, in a first contiguous region, identifying events that each include a run of zero-valued coefficients preceding a run of one or more non-zero-valued coefficients. The method includes for each such event, jointly encoding the runlengths of the preceding run of zero-valued coefficients and the following run of non-zero-valued coefficients with a codeword, such that for at least some events, relatively more likely-to-occur pairs of runlengths are encoded by a shorter codeword than relatively less likely-to-occur runlengths. The method further includes encoding each amplitude in the run of consecutive non-zero-valued coefficients, and encoding the signs of such coefficients. In an improved variation, each event includes a single zero-valued coefficient following the run of non-zero-valued coefficients.

In each of the 2-D Non-Zero/Zero Cluster Coding Method, the Basic Hybrid VLC Method, and the Extended Hybrid VLC Method, various variable length coding methods are introduced to encode the relative positions of the clustered or non-clustered transform coefficients. After each such encoding, a coding of the magnitude of each non-zero valued coefficient is included, as is a sign bit (+ or −).

The inventors have noticed that encoding the amplitudes takes up a significant part of the code in VLC coding of clusters of non-zero-valued coefficients.

The inventors observed that, at least in theory, an improvement in amplitude code can be achieved by introducing a single multi-dimensional code, say an n-dimensional code, n an integer greater than 1, to encode n clustered non-zero coefficients, instead of using n separate one dimensional codes. The Basic Multi-Dimensional Amplitude Coding Method of above-mentioned incorporated-by-reference U.S. patent application Ser. No. 10/922,507 includes such multi-dimensional amplitude coding.

One embodiment of the Basic Multi-Dimensional Amplitude Coding Method includes, in a first region, identifying events that each includes a run of one or more non-zero-valued coefficients, and for each such event, encoding the event with a codeword such that for at least some events, relatively more likely-to-occur events are encoded by a shorter codeword than relatively less likely-to-occur events, and for each identified event, jointly encoding a plurality of consecutive values in the run of consecutive non-zero-valued coefficients, the joint encoding according to an amplitude coding method. The method is such that relatively short codewords are formed to represent values or sequences of values that are relatively more likely-to-occur, and relatively long codewords are formed to represent values or sequences of values that are relatively less likely-to-occur. The method is applicable to encoding a region in the series where there is likely to be a cluster of non-zero-valued coefficients.

While the Basic Multi-Dimensional Amplitude Coding Method invention described in U.S. patent application Ser. No. 10/922,507 appears to improve the overall coding efficiency, it was observed that the size of the n-dimensional table used for the joint encoding can become rather large for a large "n." As a result, in practice, the size of n has to be limited to a low number of consecutive non-zero-amplitude values, such as 1, 2 and 3 for practical implementation.

With this in mind, the Multi-Table Amplitude Coding Method of above-mentioned incorporated by reference U.S. patent application Ser. No. 11/069,622 was introduced.

Rather than using a single multidimensional coding table for a cluster of a number, say n consecutive non-zero-valued coefficients, events are identified within the cluster that each include a run of consecutive amplitude-1 coefficients, followed by a single coefficient of amplitude greater than 1. Included are events of only a single coefficient of amplitude greater than 1 and runs of only amplitude 1. For each event, a codeword is assigned to the runlength of the preceding run of amplitude-1 coefficients combined with the amplitude of the ending coefficient. A two-dimensional coding table is used for each cluster length n, so that the multidimensional table of the Basic Multi-Dimensional Amplitude Coding Method is replaced by a number of increasingly large 2-D coding tables. The value of n can be as large as the position of the breakpoint.

The Multi-Table Amplitude Coding Method takes advantage of the observation that in the low frequency region of the sequence of transform coefficients, there is a dominance of amplitude-1 coefficients in the clusters of non-zero coefficients.

The inventions described in the Basic Hybrid VLC Method and the 2-D Non-Zero/Zero Cluster Coding Method introduced various variable length coding techniques to take care of only the positions of the clustered or scattered transform coefficients. The inventions described in the Basic Multi-Dimensional Amplitude Coding Method and in the Multi-Table Amplitude Coding Method introduce methods of encoding the amplitudes of the clusters.

There still is a need in the art for a method that combines encoding the positions of transform coefficients and the amplitude of transform coefficients.

SUMMARY

A method, apparatus, and carrier medium to process an ordered series of digital signals that each have an amplitude from a finite set of amplitudes consisting of the most likely-to-occur amplitude and at least one other amplitude. The at least one other amplitude includes a next most likely-to-occur amplitude to the most likely-to-occur amplitude. The processing is to reduce the amount of data used to represent the digital signals and to form codewords such that the relatively more likely-to-occur values or sequences of values of digital signals are represented by relatively short codewords and the relatively less likely-to-occur values or sequences of values of digital signals are represented by relatively long codewords.

In one embodiment, the method includes, for a first contiguous region in the series, identifying clusters that each includes one or more consecutive signals having any amplitude other than the most likely-to-occur amplitude, and any intervening runs of consecutive coefficients having the most likely-to-occur value. The method further includes, for each identified cluster of signals having any amplitude other than the most likely-to-occur amplitude, identifying one or more position events to define the relative positions and runlength of the identified cluster of signals having any amplitude other than the most likely-to-occur amplitude, and any intervening runs of consecutive coefficients having the most likely-to-occur value. The method further includes for each identified cluster of signals having any amplitude other than the most likely-to-occur amplitude, identifying one or amplitude events that define amplitudes of the consecutive coefficients having amplitude other than the most likely-to-occur amplitude. The method further includes jointly encoding the identifies position event or events and the identified amplitude event or events to produce a codeword for the cluster such that relatively short codewords are used to represent amplitude clusters that are more likely-to-occur, and relatively long codewords are used to represent amplitude clusters that are relatively less likely-to-occur.

In one embodiment described, the ordered series of digital signals is a series of quantized coefficients of a transformed block of image data. The transform is such that the most likely-to-occur amplitude is 0, and the next most likely-to-occur amplitude is 1.

In the case of quantized coefficients, the method includes identifying clusters of at least one non-zero-valued coefficients, and for each such cluster, identifying at least one position event to identify the relative position and runlength of the cluster of non-zero coefficients, and identifying at least one amplitude event to define the non-zero amplitudes in the cluster of non-zero coefficients. The method further includes jointly coding the identified position event(s) and the identified amplitude event(s) such that relatively short codewords are formed to represent values or sequences of values that are relatively more likely-to-occur, and relatively long codewords are formed to represent values or sequences of values that are relatively less likely-to-occur. The method is applicable to encoding a region in the series where there is likely to be a cluster of non-zero-valued coefficients.

Some embodiments described herein use the position events that are as coded in the 2-D Non-Zero/Zero Cluster Coding Method. Some embodiments further use non-zero amplitudes as the amplitudes events as in the Basic Multi-Dimensional Amplitude Coding Method. Other embodiments identify amplitude events in the same manner as the Multi-Table Amplitude Coding Method. Yet other embodiments use the amplitude events of Basic Multi-Dimensional Amplitude Coding Method for some cluster lengths, and the amplitude events of the Multi-Table Amplitude Coding Method for other cluster lengths.

BRIEF DESCRIPTION OF THE DRAWINGS

FIG. 2 shows a code table for the positions of zeroes and clusters of non-zero coefficients using an embodiment of the 2-D Non-Zero/Zero Cluster Coding Method used in one embodiment of the invention.

DETAILED DESCRIPTION

An aspect of the present invention combines the coding method used to code the position of consecutive non-zero-valued coefficients that occur in runs of non-zero-valued coefficients ("clusters") with the coding method used to code the amplitudes of the non-zero-valued coefficients in the clusters to produce a combined code for coding an ordered series of quantized coefficients of a transform of image data in a first region—the low frequency region—of the series. Such a series occurs in many image compression methods.

While the description is written in terms of an ordered series of digital values that are quantized transform coefficients of a block of image data, with zero-valued quantized coefficients being the most likely-to-occur, and quantized coefficients of value ±1 being the next most likely-to-occur values, the invention is, in general, applicable to an ordered series of digital signals that each have an amplitude from a finite set of amplitudes consisting of the most likely-to-occur amplitude and at least one other amplitude.

Figure 1:
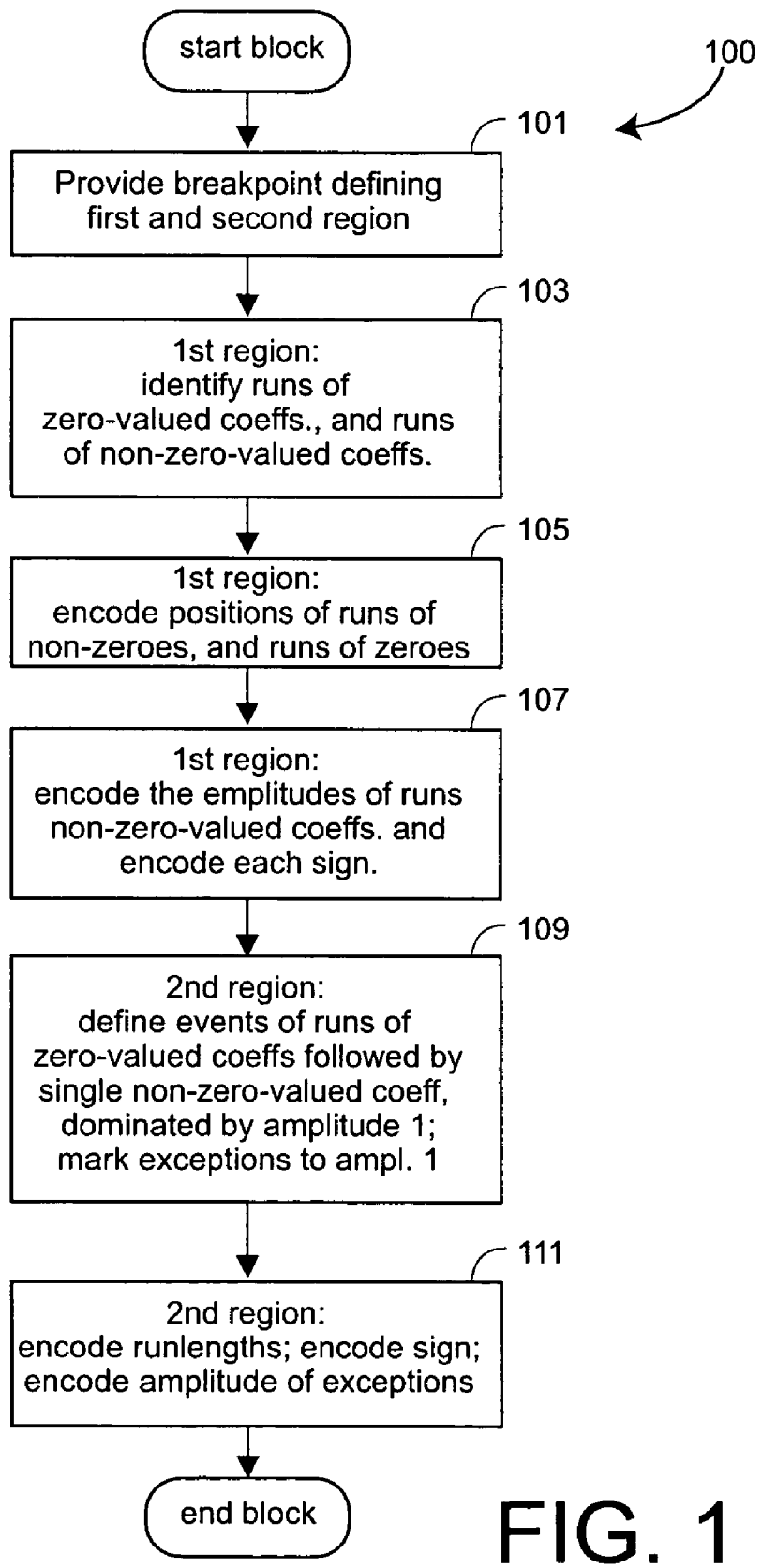
FIG. 1 shows a flow chart of one embodiment of a hybrid variable length coding (VLC) method that includes in a first region coding the positions and length of clusters of non-zero coefficients and of zero-valued coefficients, and further that includes coding the amplitudes of the coefficients in the clusters of non-zero-valued coefficients.

FIG. 1 shows a flow chart of one embodiment of a hybrid variable length coding (VLC) method 100 that includes in 101 providing a breakpoint along the ordering of the series to define a first, e.g., low frequency region wherein non-zero-coefficients are likely to be clustered, and a second, e.g., high-frequency region where non-zero coefficients are likely to be scattered, and in the version shown, likely to be dominated by amplitude-1 coefficients.

In 103, each run of consecutive zero-valued coefficients, and each run of consecutive non-zero-valued coefficients (called "clusters") is identified. Different encoding methods are available for encoding the positions of the zero and non-zero-valued coefficients. The Basic Hybrid Method and the Extended Hybrid Method provide separate codewords for the runlengths of the zero-value coefficients, and for the runlengths of the clusters of non-zero-valued coefficients. The codes include variable length codes determined using assumed or actual statistics. Thus, step 103 identifies the runlengths of the consecutive zero-valued coefficients and of the non-zero-valued coefficients.

The 2-D Non-Zero/Zero Cluster Coding Method on the other hand forms a codeword for the joint coding of the runlengths of consecutive zero-valued coefficients that precedes a run of one or more non-zero-valued coefficients that is followed by a single zero-valued coefficient. Thus, in the case that the first region coding uses an embodiment of the 2-D Non-Zero/Zero Cluster Coding Method, step 103 includes identifying the runlengths of consecutive zero-values coefficients and of the cluster of non-zero-valued coefficients that follows the zeroes, including a single zero-valued coefficient following the run of non-zero-valued coefficients. Furthermore, events that have no non-zero-valued coefficients preceding the non-zero coefficient(s) are included. In 105, the identified events are encoded using joint encoding for each event of the runlength of the preceding zero-valued coefficient and the runlength of the following one or more non-zero-valued coefficients. In one embodiment using the 2-D Non-Zero/Zero Cluster Coding Method, 105 includes using a two-dimensional lookup table of codes. The codes include variable length codes determined using assumed or actual statistics.

In 107, the amplitudes in each run of non-zero-amplitudes in the identified event is encoded using an amplitude code. In an embodiment described in the Basic Hybrid Coding Method, the Extended Hybrid Coding Method, and in the 2-D Non-Zero/Zero Cluster Coding Method, each amplitude is separately encoded, e.g., using a variable length code obtained using a code table.

As an example, consider the Basic Hybrid Coding Method and the Extended Hybrid Coding Method. Denote by $r(n)$ an identified run of n consecutive non-zero coefficients, and $r'(z)$ an identified run of z consecutive zero-valued coefficients in the first region, $n,z=1, 2, \ldots$ Consider a single event denoted by $r(n)$, denote each of the non-zero amplitudes in $r(n)$ by $m(1), m(2), \ldots, m(n)$. Denote by $C(n)$ the variable length codeword for the run length of non-zero-valued coefficients in the event $r(n)$, $n=1, 2, \ldots$ and $C'(z)$ the variable length codeword for the run length of zero-valued coefficients in the event $r'(z)$, $z=1, 2, \ldots$ Denote by $A(a)$ the amplitude encoding of an amplitude a, $a=1, 2, \ldots$, in the run $r(n)$ of non-zero-valued coefficients; and denote by $S(1), S(s), \ldots S(n)$ the sign bits for the first, second, $\ldots$, n'th non-zero-valued coefficient in $r(n)$. Then according to embodiments described in the Basic Hybrid Coding Method and the Extended Hybrid Coding Method, the encoding of the event and the corresponding non-zero amplitudes is:

$$C(n)+A(m(1))+S(1)+A(m(2))+S(2)+\ldots+A(m(n))+S(n)+C'(z),$$

where + denoted concatenation.

As another example, suppose a pair of "z" consecutive zero-valued coefficients and "n" consecutive no n-zero-valued coefficients, followed by a single zero-valued coefficient, is coded using the coding invention described in the 2-D Non-Zero/Zero Cluster Coding Method. Denote the positions of the zero-valued/non-zero valued coefficients by $R(z,n)$ and denote each of the amplitudes by $m(1), m(2), \ldots, m(n)$. Denote by $C(z,n)$ the variable length codeword for the event $R(z,n), z=0, 1, \ldots, n=1, 2, \ldots$; denote by $A(a)$ the amplitude encoding of an amplitude a, $a=1, 2, \ldots$, in the run of non-zero-valued coefficients in $R(z,n)$; and denote by $S(1), S(2), \ldots$, the sign bits for the first, second, $\ldots$, n'th non-zero-valued coefficient in $R(z,n)$. Then, according to one embodiment described in the 2-D Non-Zero/Zero Cluster Coding Method, the encoding of the event and the corresponding non-zero amplitudes is:

$$C(z,n)+A(m(1))+S(1)+A(m(2))+S(2)+\ldots+A(m(n))+S(n),$$

where + denoted concatenation.

Step 107 may also be encoded using an aspect of the Basic Multi-Dimensional Amplitude Coding Method. One such aspect is to use a single codeword obtained by a multidimensional amplitude encoding method to encode the sequence of amplitudes $A(m(1)), A(m(2)), \ldots, A(m(n))$ by a variable length codeword. The codeword can be obtained by a multi-dimensional coding table, obtained using assumed or measured statistics. For example, denote by $A_n(m(1), m(2), \ldots, m(n))$ the codeword for the sequence of n quantized amplitudes $m(1), m(2), \ldots, m(n), n=1, 2, \ldots$. According to one embodiment of the Basic Multi-Dimensional Amplitude Coding Method, the event $R(z,n)$ and associated amplitudes and signs is encoded, when using the 2-D Non-Zero/Zero Cluster Coding Method together with an embodiment of the Basic Multi-Dimensional Amplitude Coding Method as:

$$C(z,n)+A_n(m(1), m(2), \ldots, m(n))+S(1)+S(2)+\ldots+S(n),$$

and in one embodiment when using the Basic Hybrid Coding Method or the Extended Hybrid Coding Method with the Basic Multi-Dimensional Amplitude Coding Method, as:

$$C(n)+A_n(m(1), m(2), \ldots, m(n))+S(1)+S(2)+\ldots+S(n)+C'(z).$$

In order to make the size of the multi-dimensional tables manageable from a practical implementation point of view, the maximum length of the run of non-zero amplitudes jointly encoded using the Basic Multi-Dimensional Amplitude Coding Method is restricted to relatively low numbers such as 2 or 3 in a practical implementation.

The Multi-Table Amplitude Coding Method uses an observation that in clusters of non-zero-valued coefficients, the appearance of amplitude 1 is more likely than that of amplitude 2, the appearance of amplitude 2 is more likely than that of amplitude 3, and so forth. In one embodiment of the Multi-Table Amplitude Coding Method, within each identified cluster of a number, denoted n, of non-zero valued coefficients, events are recognized of consecutive amplitude-1 coefficients followed by single coefficient of amplitude greater than one. Such events include the runlength of 0 amplitude-1 coefficients followed by the single coefficient of amplitude greater than 1. Denote by j, j=0, 1, 2, . . . ,n−1 the length of the amplitude 1 coefficients, and denote by k, k=2, 3, . . . , M the amplitude of the ending coefficient. It also is possible to have all 1's in the cluster. One embodiment of the Multi-Table Amplitude Coding Method includes assigning a variable length code for each identified event of the combination of the runlength of 1's and the amplitude of the final coefficient, or for an exception of all 1's. The variable length code may be assigned using assumed or measured statistics. A 2-D code table may be built to assign the codes. There is a different code table for each cluster length n. Denote by $C_n(j,k)$ the variable length codeword. Suppose there are p such events in a cluster of length n. Denote by $n_{events}$ the number of such events in a cluster of length m, and $j_i$ and $k_i$ the runlength of preceding amplitude-1 coefficients, and the value of the final coefficient, respectively, in the ith event, i=1, 2, . . . , $n_{events}$, $j_i$=0, 1, . . . , and $k_i$=2, 3, . . . . Further denote by $S_i(1), S_i(2), \ldots, S_i(j_i+1)$ the sign code of the non-zero coefficients in the ith event. Then, using an embodiment of the 2-D Non-Zero/Zero Cluster Coding Method together with an embodiment of the Multi-Table Amplitude Coding Method, and denoting concatenation over the values of i by $\Sigma_i$, the codewords for the first region are:

$$C(z,n)+\Sigma_i\{C_n(j_i,k_i)+S_i(1)+\ldots+S_i(j_i+1)\}.$$

Furthermore, using the Basic Hybrid Coding Method or the Extended Hybrid Coding Method with the Multi-Table Amplitude Coding Method, the codewords are:

$$C(n)+\Sigma_i\{C_n(j_i,k_i)+S_i(1)+\ldots+S_i(j_i+1)\}+C'(z).$$

Note that the inventors have noted that for short clusters, e.g., n=2 or 3, the Basic Multi-Dimensional Amplitude Coding Method works well, while for longer clusters, e.g., n>3, the Multi-Table Amplitude Coding Method is preferred. Thus, one embodiment uses both the Basic Multi-Dimensional Amplitude Coding Method and the Multi-Table Amplitude Coding Method depending on the length of the cluster of non-zero-valued coefficients.

For example, in the case that the Basic Multi-Dimensional Amplitude Coding Method is used for cluster lengths n≦3, and the Multi-Table Amplitude Coding Method is used for cluster lengths n>3, and the 2-D Non-Zero/Zero Cluster Coding Method is used for encoding the relative position of a cluster of non-zero-valued coefficients of length n, then the code for the cluster and position may be expressed as if n≦3 then $C(z,n)+A_n(m(1), m(2), \ldots, m(n))+S(1)+S(2)+\ldots+S(n)$, else if n>3 then $C(z,n)+\Sigma_i\{C_n(j_i,k_i)+S_i(1)+\ldots+S_i(j_i+1)\}$.

Another way of expressing this coding function is as:

$$\alpha V_{R(z,n), A_n}\{R(z,n),m(1),\ldots,m(n)\}+(1-\alpha)V_{R(z,n),C_n}\{R(z,n),(j_1,k_1),j_2,k_2),\ldots\},$$

where α=1 for short clusters of non-zero-valued coefficients, for example, values of n=1, 2, or 3, and α=0 for n>3.

Moving onto 109, in the version shown in FIG. 1, the second, e.g., high frequency region is encoded as described in the Extended Hybrid Coding method. Thus, in 109, events are defined that are each either no consecutive zero-valued coefficients, or a run of one or more zero-valued coefficients followed by a single non-zero-valued coefficient. Any such non-zero coefficient is assumed to have amplitude 1 such that no amplitude encoding is required for such a coefficient. A non-amplitude-1, non-zero coefficient is marked as an exception. Furthermore, the remainder of the block being zero is also identified. In 111, for each identified event in the second region, the runlength of the zero-valued coefficients preceding the single non-zero-valued coefficient is encoded using a variable length runlength coding method, implemented, e.g., as a coding table. The sign of the ending non-zero-value coefficient is encoded by a sign bit, and, in the case that the non-zero-valued coefficient is the exceptional case of not having amplitude 1, an exception code followed by an amplitude code is included. The amplitude code is obtained, e.g., using an amplitude coding table, which in general is different than the amplitude coding table used for encoding the non-zero-amplitudes in the first region, since the second region amplitudes are more likely to have lower value than the first region amplitudes.

How to set up the codeword tables includes either assuming or obtaining statistics for typical series of coefficient image blocks, or, in an adaptive system, by measurement of the relative frequencies of occurrence of events and amplitudes, depending on the coding method, e.g., code table.

Figure 3:
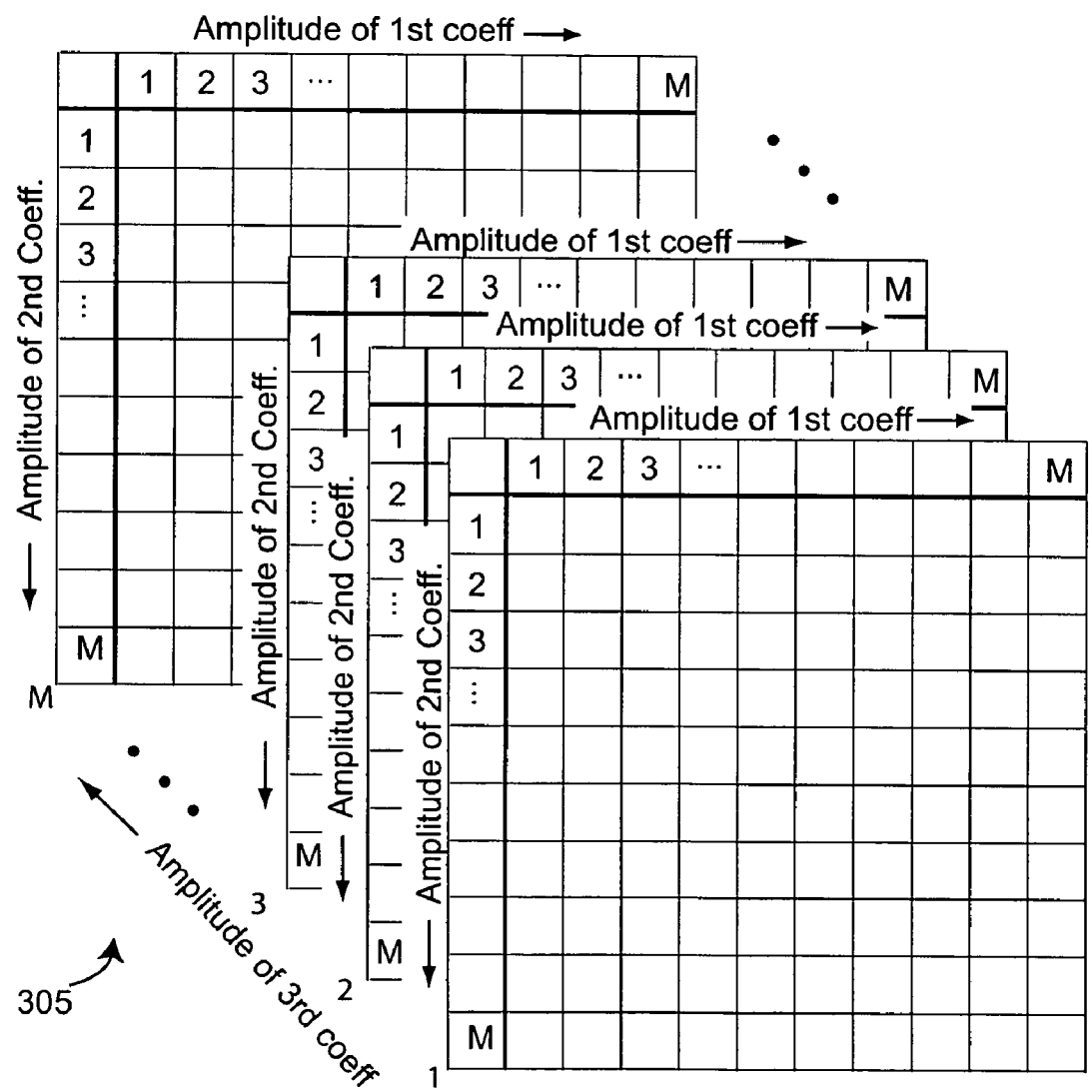
FIG. 3 shows a 3-D code table for the amplitudes of clusters of three consecutive non-zero coefficients for using the Basic Multi-Dimensional Amplitude Coding Method in one embodiment of the invention.
Figure 4:
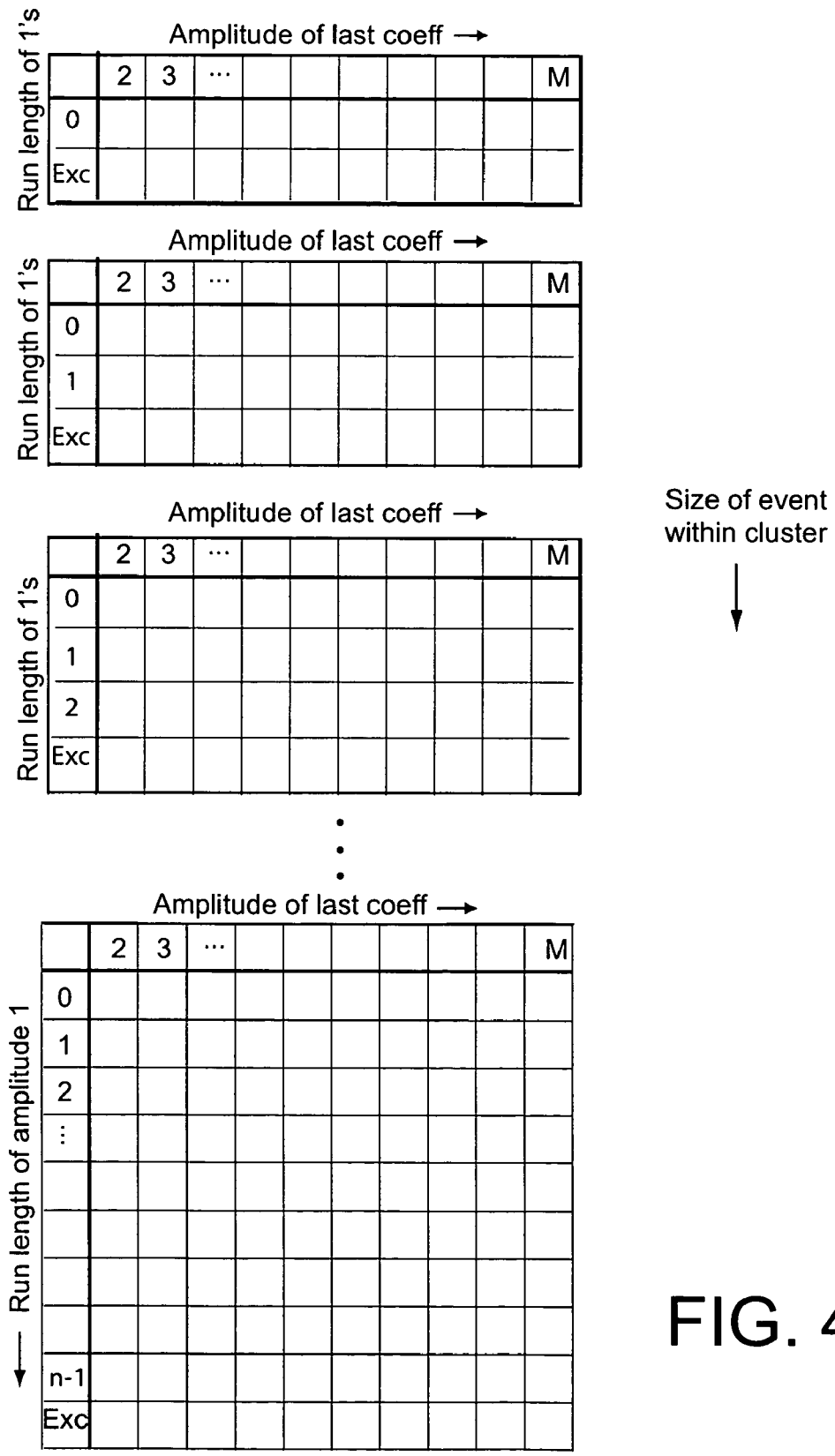
FIG. 4 shows a set of 2-D code tables for the events within a cluster of n non-zero coefficients, each event being a runlength of preceding amplitude 1 coefficients for the runlength =0, 1, . . . , n−1, followed by the final amplitude larger than 1, for using the Multi-Table Amplitude Coding Method in one embodiment of the invention.

FIG. 2 shows a code table for the positions of zeroes and clusters of non-zero coefficients using an embodiment of the 2-D Non-Zero/Zero Cluster Coding Method. FIG. 3 shows a 3-D code table 305 for the amplitudes up to value M of clusters of three consecutive non-zero coefficients. FIG. 4 shows a set of 2-D code tables for the events within a cluster of n non-zero coefficients, each event being a runlength of preceding amplitude 1 coefficients for the runlength=0, 1, . . ., n−1, followed by the final amplitude larger than 1. Since the runs of the non-zero values can be all amplitude 1, such events, called exceptions, have been denoted as "Exc" and the codeword for such events denoted by $C_n$(Exc). Note that there are n such tables of the events, depending on the runlength of the cluster of non-zero amplitude coefficients.

One aspect of the present invention is to jointly encode the relative position and runlength of each clusters of non-zero valued coefficients with the amplitudes of the non-zero-coefficients in the cluster to form a joint codeword for the combination of the relative position of the cluster and of the non-zero amplitudes within the cluster. In particular, one aspect of the present invention is that rather than concatenating the codes for the position of clusters with the codes for the amplitudes of the non-zero coefficients in the clusters, a function of the position on the one hand, and non-zero amplitudes position and non-zero-coefficient amplitudes of the cluster. In one embodiment, the signs of the non-zero amplitudes are included such that the function is also of the signs of the non-zero amplitudes.

Figure 5:
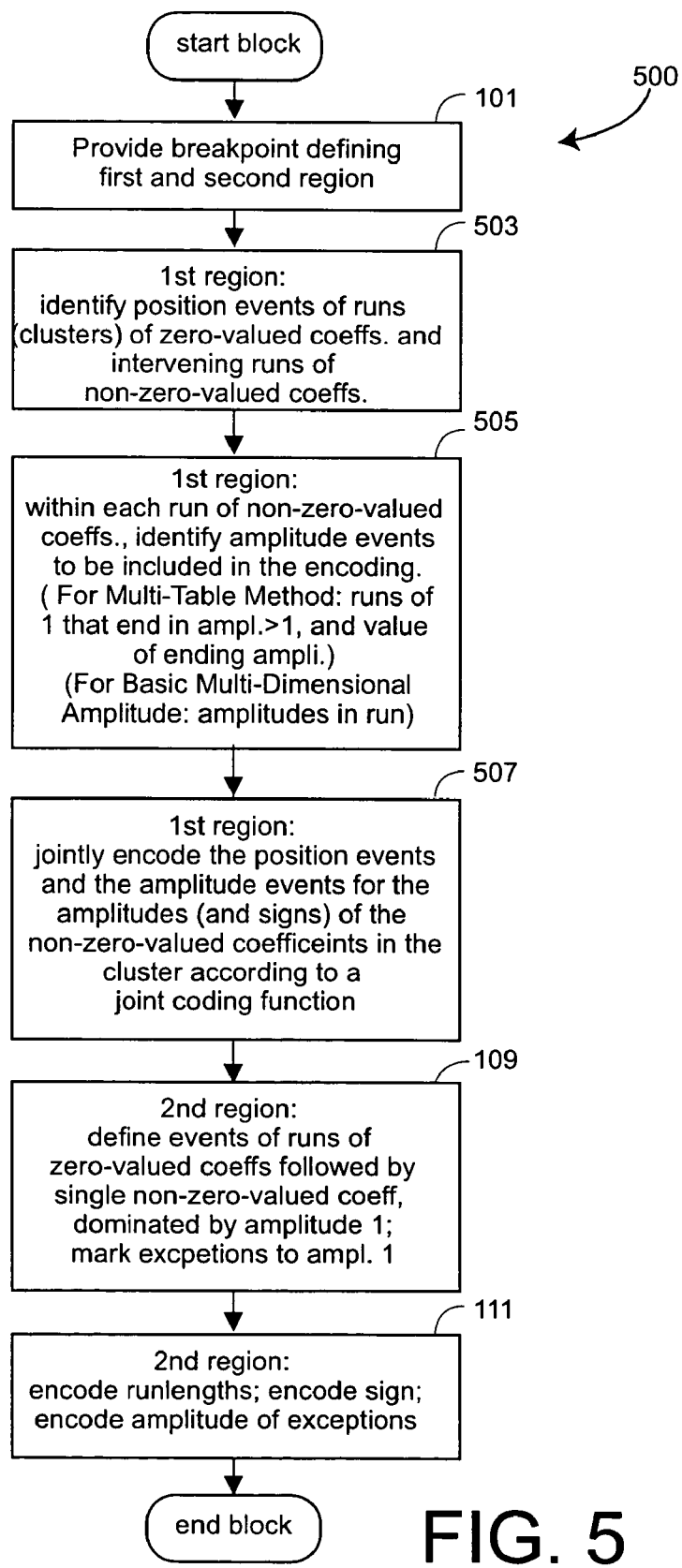
FIG. 5 shows a flow chart of one embodiment of a hybrid variable length coding (VLC) method, which includes encoding the positions and lengths of clusters of non-zero-valued coefficients and of zero-valued coefficients, encoding the amplitudes in the runs of non-zero-valued coefficients, and, according to an aspect of the invention, coding the positions and the amplitudes using a joint coding table of the position codes and the amplitude codes.

FIG. 5 shows a flow chart of one embodiment of a hybrid variable length coding (VLC) method, which includes jointly encoding the relative positions and lengths of clusters of non-zero-valued coefficients and runs of zero-valued coefficients, and the amplitudes in the runs of non-zero-valued coefficients.

In 101, a breakpoint is provided, as in FIG. 1, to define a first (low-frequency) region and a second (high-frequency) region along the ordering of a series of quantized transform coefficients.

In 503, position events in the first region are identified. The position events are to provide the relative positions and run-lengths of clusters of non-zero-valued coefficients and of intervening runs of zero-valued coefficients. In one version, identifying these position events includes recognizing events as described in the Basic Hybrid Coding Method and the Extended Hybrid Coding Method. When the idea of the 2-D Non-Zero/Zero Cluster Coding Method is used, the events are defined by the runlength of any run of consecutive zero-valued coefficients that precedes a cluster of non-zero values coefficients followed by a single zero-valued coefficient, and the runlength of the cluster of non-zero-valued coefficient.

In 507 amplitude events in the first region are identified. When the joint coding includes the ideas behind the Basic Multi-Dimensional Amplitude Coding Method, the amplitude events are the amplitudes in the cluster of non-zero-valued coefficients. One embodiment further includes the signs of the non-zero-coefficients in the cluster. When the joint coding includes the ideas behind the Multi-Table Amplitude Coding Method, the events are, within each cluster, the runlengths of any run of consecutive amplitude-1 coefficients that precedes any coefficient of amplitude greater than one, and the value of the ending amplitude. In one embodiment, the amplitude events include the signs of the non-zero coefficients in the cluster of non-zero-valued coefficients.

In 509, the identified position events and amplitude events for each cluster of non-zero-valued coefficients and intervening zero-valued coefficients in the first region are jointly encoded. Assuming the position events use the ideas described in the 2-D Non-Zero/Zero Cluster Coding Method, denote by $R(z,n)$ each recognized position event representing a cluster of n consecutive non-zero-valued coefficients preceded by a run of z zero-valued coefficients followed by a single zero-valued coefficient, $z=0, 1, \ldots, n=1, 2, \ldots$. Further, assuming joint amplitude coding as in Basic Multi-Dimensional Amplitude Coding Method, denote by $m(1), \ldots, m(n)$ the n non-zero amplitudes in the cluster. Then, in accordance with one embodiment, instead of encoding position and amplitude independently and concatenating the results together as $C(z,n)+A_n(m(1), \ldots, m(n))$, where $C(z,n)$ is a position code for $R(z,n)$, and $A_n(m(1), \ldots, m(n))$ is the joint amplitude code for the non-zero amplitudes, one aspect of the invention is that 509 of carries out the encoding by a joint integrated coding function of the position events and of the amplitude events. That is, for the cluster at position $R(z,n)$, $$V_{R(z,n),A_n}\{R(z,n),m(1), \ldots, m(n)\}$$

where $V_{R(z,n),A_n}\{\}$ is the code for the combination of $R(z,n)$ and amplitudes $m(1), \ldots, m(n)$. In one embodiment, $V_R(z,n), A_n\{.\}$ is also a function of the concatenated code bits used to encode the signs of the non-zero-valued coefficients in the cluster of non-zero coefficients.

Thus, to encode the region, the position events of clusters of non-zero-amplitude coefficients preceded by a run of zero-valued coefficients and followed by a single zero-valued coefficient $R(z,n)$ are recognized as in the 2-D Non-Zero/Zero Cluster Coding Method, and the amplitude events of the cluster are identified as in the Basic Multi-Dimensional Amplitude Coding Method. The resulting position and amplitude events are used to look up a codeword using a multi-dimensional coding table $V_R(z,n),A_n\{R(z,n),m(1), \ldots, m(n)\}$. The table $V_{R(z,n),A_n}$ is built up using assumed, or in an adaptive method, using measured statistics. Of course the dimensionality of the table is quite large: two more than the dimensionality of using the Basic Multi-Dimensional Amplitude Coding Method.

In another embodiment of 507, the amplitude events of the Multi-Table Amplitude Coding Method are used together with the position events of 2-D Non-Zero/Zero Cluster Coding Method to jointly encode the position and amplitude of the cluster. The integrated code of step 507 in such an embodiment can be described as:

$$V_{R(z,n),C_n}\{R(z,n), (j_1,k_1), j_2,k_2), \ldots \}$$

where $V_{R(z,n),C_n}\{.\}$ is the joint code for the combination of the position event $R(z,n)$ as defined in the 2-D Non-Zero/Zero Cluster Coding Method, each $(j_i,k_i)$ is the i'th amplitude events recognized in the cluster, i at least 1, such i'th event having a single non-zero amplitude, denoted $k_i$, with $k_i$ greater than 1, preceded by a run of $j_i$ consecutive amplitude-1 coefficients, $j_i \geq 0$, as defined in the Multi-Table Amplitude Coding Method. In one embodiment, the amplitude events $\{(j_i,k_i)\}$ are combined with the sign codes for each such event, such that $V_{R(z,n),C_n}\{.\}$ is also a function of the code bits used to encode the signs of the non-zero-valued coefficients of the amplitude events in the cluster of non-zero-valued coefficients.

In yet another embodiment, integration of the position and amplitude events in 507 by a single joint encoding is extended to using position events according to at least one position coding method to include position encoding in the joint coding, and to using amplitude events according to at least one amplitude coding method to include position encoding in the joint coding.

In one embodiment, as an example, the position events of a cluster of non-zero coefficients are identified as in the 2-D Non-Zero/Zero Cluster Coding Method, for some cluster lengths, amplitude events as used in the Basic Multi-Dimensional Amplitude Coding Method are used, and for other cluster lengths, amplitude events as used in the Multi-Table Amplitude Coding Method are used. The resulting joint code for the cluster may be defined by the encoding function of the position event and the amplitude events for a cluster of non-zero-valued coefficients as:

if $n \leq 3$ then $V_{R(z,n), A_n}\{R(z,n),m(1), \ldots, m(n)\}$ else if
$n>3$ then $V_{R(z,n),C_n}\{R(z,n),(j_1,k_1),j_2,k_2), \ldots \}.$, Another way of expressing this coding function is as:

$$\alpha V_{R(z,n), A_n}\{R(z,n),m(1), \ldots, m(n)\}+(1-\alpha) V_{R(z,n), C_n}\{R(z,n),(j_1,k_1),j_2,k_2), \ldots \},$$

where $\alpha=1$ for short clusters of non-zero-valued coefficients, for example, values of $n=1, 2$, or 3, and $\alpha=0$ for $n>3$. Using such a combined code is based on the observation that the inventors made that the performance of using the Basic Multi-Dimensional Amplitude Coding Method reaches a diminishing return after a small dimension/cluster such as $n=3$, and the performance of the Multi-Table Amplitude Coding Method improves for larger clusters.

Of course such joint coding of both relative position, of runlength, and of the amplitudes of each cluster can lead to extremely complex and large coding tables. In practice, the inventors have found that because relatively low non-zero amplitude values such as 1 and 2 are so much more likely-to-occur than higher amplitude values such as 3, 4, 5, and so forth. Therefore, in a practical implementation, the amplitude values for clusters of non-zero-coefficients used in the joint encoding functions are restricted relatively low amplitude values such as 1 and 2. Clusters containing higher values such as 3, 4, 5, . . . are encoded by separate position and amplitude codes as described, for example, in a combination of the 2-D Non-Zero/Zero Cluster Coding Method with the Basic Multi-Dimensional Amplitude Coding Method, or in a combination of the 2-D Non-Zero/Zero Cluster Coding Method with the Multi-Table Amplitude Coding Method, or in a combination of both methods. Because non-zero amplitude values of 1 and 2 are so much more likely-to-occur than the higher amplitudes, so limiting the amplitudes encoded by the joint encoding function should not affect the essential performance of the methods too much.

It should be noted that in each case, the joint coding function is different for each runlength of non-zero-valued coefficients.

EXAMPLE

Coding using aspects of the present invention are now described as an example, and compared to encoding according to conventional 2D-VLC, the Basic Hybrid VLC Method, the 2-D Non-Zero/Zero Cluster Coding Method with conventional amplitude coding, the 2-D Non-Zero/Zero Cluster Coding Method with the Multi-Dimensional Amplitude Coding Method, and the 2-D Non-Zero/Zero Cluster Coding Method with the Multi-Table Amplitude Coding Method.

Suppose a sequence of quantized transform coefficients in the low frequency region is as follows, excluding the DC coefficient, and assuming a breakpoint N=19:

3–1 1 1–2 1 1 0 0–1 2 1 0 1–1 0 0 0 1 |0, where | represents the breakpoint.

Coding using Conventional 2D-VLC

Coding using conventional 2D-VLC includes identifying events of a run of preceding zero-valued coefficients followed by a single non-zero coefficient. Using | to separate such events, the low frequency region consists of:

|3|–1|1|1|–2|1|1|0 0–1|2|1|0 1|–1|0 0 0 1|

(C0 3+S$_+$)+(C0 1+S$_-$)+(C0 1+S$_+$)+(C0 1+S$_+$)+(C0 2+
S$_-$)+(C0 1+S$_+$)+(C0 1+S$_+$)+(C2 1+S$_-$)+(C0 2+S$_+$)+
(C0 1+S$_+$)+(C1 1+S$_+$)+(C0 1+S$_-$)+(C3 1+S$_+$)

where Czj represents 2D-VLC code for an event of a runlength of z preceding zero-valued coefficients, z=0, 1, . . . , followed by a single non-zero coefficient of amplitude j, j=1, 2, . . . , and where S$_+$ and S$_-$ represents codes used to encode positive and negative signs, respectively.

Coding using the Basic Hybrid VLC Method

Coding using the Basic Hybrid VLC Method in the first (low-frequency) region includes identifying events of a run of zero-valued coefficients and alternate runs (clusters) of non-zero coefficients. Using | to separate such events, the low frequency region consists of:

|3–1 1 1–2 1 1|0 0|–1 2 1|0|1–1|0 0 0|1|

|C(7)+(A(3)+S$_+$)+(A(1)+S$_-$)+(A(1)+S$_+$)+(A(1)+S$_+$)+
(A(2)+S$_-$)+(A(1)+S$_+$)+(A(1)+S$_+$)|+|C'(2)|+|C
(3)+(A(1)+S$_-$)+(A(2)+S$_+$)+(A(1)+S$_+$)|+|C'(1)|+
|C(2)+(A(1)+S$_+$)+(A(1)+S$_-$)|+|C'(3)|+|(C1)+(A
(1)+S$_+$)| where C(n) and C'(z) represent the codewords, e.g., the runlength codes for the runlength denoted n of nonzero coefficient clusters and for the runlength denoted z of consecutive zero-valued coefficients, respectively, and A(i) represents the magnitude code of a nonzero amplitude i.

Coding using the 2-D Non-Zero/Zero Cluster Coding Method with Conventional Amplitude Coding Coding using the 2-D Non-Zero/Zero Cluster Coding Method with separate amplitude coding of the non-zero-valued coefficients in the first (low-frequency) region includes identifying events of a run of zero-valued coefficients preceding a run (cluster) of non-zero coefficients followed by a single zero-valued coefficient. Using | to separate such events, the low frequency region consists of, assuming a soft boundary:

|3–1 1 1–2 1 1 0|0–1 2 1 0|1–1 0|0 0 1 0|.

The code is:

|C(0,7)+(A(3)+S$_+$)+(A(1)+S$_-$)+(A(1)+S$_+$)+(A(1)+
S$_+$)+(A(2)+S$_-$)+(A(1)+S$_+$)+(A(1)+S$_+$)|+|C(1,3)+
(A(1)+S$_-$)+(A(2)+S$_+$)+(A(1)+S$_+$)|+|C(0,2)+(A
(1)+S$_+$)+(A(1)+S$_-$)|+|C(2,1)+(A(1)+S$_+$)| where C(z,n) represents position code for 2D non-zero/zero clusters.

Coding using the 2D Non-Zero/Zero Cluster Coding Method with the Multi-Dimensional Amplitude Coding Method Coding using the the 2-D Non-Zero/Zero Cluster Coding Method with the Multi-Dimensional Amplitude Coding Method to code the position and amplitudes of clusters non-zero-valued coefficients in the first (low-frequency) region includes identifying events of a run of zero-valued coefficients preceding a run (cluster) of non-zero coefficients followed by a single zero-valued coefficient. Using | to separate such events, the low frequency region consists of, assuming a soft boundary, the sequence can be written as:

|3–1 1 1–2 1 1 0|0–1 2 1 0|1–1 0|0 0 1 0.

The code is:

|C(0,7)+A$_7$(3,1,1,1,2,1,1)+S$_+$+S$_-$+S$_+$+S$_+$+S$_-$+S$_+$+S$_+$)
|+|C(1,3)+A$_3$(1,2,1)+S$_-$+S$_+$+S$_+$|+|C(0,2)+A$_2$(1,
1)+S$_+$+S$_-$)|+|C(2,1)+A$_1$(1)+S$_+$)| where A$_n$(.) are n-dimensional functions of the amplitudes of the n-consecutive non-zero amplitudes in a cluster. Note that in practice, it is unlikely that the seven-dimensional codes A$_7$ would be used, and such a code is presented here for illustrative purposes only.

Coding using the 2-D Non-Zero/Zero Cluster Coding Method with the Multi-Table Amplitude Coding Method Coding using the the 2-D Non-Zero/Zero Cluster Coding Method and the Multi-Table Amplitude Coding Method to code the positions and amplitudes of clusters of non-zero-valued coefficients in the first (low-frequency) region identifying runs of zero-valued coefficients preceding runs (cluster) of non-zero coefficients followed by a single zero-valued coefficient, then within a cluster of n consecutive non-zero coefficients, identifying events of a run of consecutive amplitude 1 coefficients followed by a single coefficient of amplitude greater than 1. Using | to separate such runs of zero preceding clusters of non-zeroes followed by a single zero, the low frequency region consists of, assuming a soft boundary, the region is:

|3 –1 1 1 –2 1 1 0|0 –1 2 1 0|1 –1 0|0 0 1 0|.

The code is:

|C(0,7)+C$_7$(0,3)+S$_+$+C$_7$(3,2)+S$_-$+S$_+$+S$_+$+S$_-$+C$_7$
(Exc)+S$_+$+S$_+$)|+|C(1,3)+C$_3$(1,2)+S$_-$+S$_+$+C$_3$
(Exc)+S$_+$|+|C(0,2)+C$_2$(Exc)+S$_+$+S$_-$|+|C(2,1)+C$_1$
(Exc)+S$_+$)| where by $C_n(j,k)$ denotes the variable length codeword within a cluster of n non-zero-valued coefficients for a run of j amplitude-1 coefficients preceding a coefficient of value k>1, and $C_n$(Esc) denotes codeword within a cluster of n non-zero-valued coefficients for a run of only amplitude-1 coefficients that is not followed by a coefficient of amplitude greater than 1.

Coding using the Code of the 2D Non-Zero/Zero Cluster Coding Method and the Code of the Multi-Dimensional Amplitude Coding Method for Short Clusters, or the Code of the Multi-Table Amplitude Coding Method for Longer Clusters Coding using the code of the 2-D Non-Zero/Zero Cluster Coding Method and the code of the Multi-Dimensional Amplitude Coding Method for short clusters, or the code of the Multi-Table Amplitude Coding Method for longer clusters to code the non-zero-valued coefficients in the first (low-frequency) region includes identifying runs of zero-valued coefficients preceding runs (cluster) of non-zero coefficients followed by a single zero-valued coefficient. The method further includes encoding the non-zero amplitudes with a multi-dimensional code for clusters of up to three non-zero coefficients, and, for any cluster of n>3 consecutive non-zero coefficients, identifying events of a run of consecutive amplitude 1 coefficients followed by a single coefficient of amplitude greater than 1. Using | to separate such runs of zero preceding clusters of non-zeroes followed by a single zero, the low frequency region consists of, assuming a soft boundary, the region is:

|3 –1 1 1 –2 1 1 0|0 –1 2 1 0|1 –1 0|0 0 1 0.

The code is:

C(0,7)+C$_7$(0,3)+S$_+$+C$_7$(3,2)+S$_-$+S$_+$+S$_+$+S$_-$+C$_7$(Exc)+
S$_+$+S$_+$)+C(1,3)+A$_3$(1,2,1)+S$_-$+S$_+$+S$_+$}+C(0,2)+
A$_2$(1,1)+S$_+$+S$_-$+C(2,1)+A$_1$(1)+S$_+$.

Note that for the first cluster of 7 non-zero coefficients, the Multi-Table Amplitude Coding Method is used to encode the non-zero valued coefficients, while for the other clusters of non-zero-valued coefficients, because the runlength of the cluster is three or less, the Basic Multi-Dimensional Amplitude Coding Method is used to encode the amplitudes in the cluster.

Coding using a Combination Code that Combines the Code of the 2-D Non-Zero/Zero Cluster Coding Method and the Code of the Multi-Dimensional Amplitude Coding Method Coding using a combination code that jointly encodes the position events of the 2-D Non-Zero/Zero Cluster Coding Method and the amplitude events of the Multi-Dimensional Amplitude Coding Method to code the non-zero-valued coefficients in the first (low-frequency) region includes identifying runs of zero-valued coefficients preceding runs (cluster) of non-zero coefficients followed by a single zero-valued coefficient, then jointly encoding these position events with the non-zero amplitudes, e.g., using a multi-dimensional code. Using | to separate such runs of zero preceding clusters of non-zeroes followed by a single zero, the low frequency region consists of, assuming a soft boundary, the region is:

|3 –1 1 1 –2 1 1 0|0 –1 2 1 0|1 –1 0|0 0 1 0.

The code is:

$V_{R(z,n),A_7}$ {R(0,7),3,1,1,1,2,1,1}+S$_+$+S$_-$+S$_+$+S$_+$+S$_-$+
S$_+$+S$_+$+$V_{R(z,n),A_3}$ {R(1,3),1,2,1}+S$_-$+S$_+$+S$_+$+
$V_{R(z,n),A_2}$ {R(0,2),1,1}+S$_+$+S$_-$+$V_{R(z,n),A_2}$
{R(2,1),1}+S$_+$, where the joint codes do not include the signs of each coefficient, such that sign codes are included separately. Note that in practice, it is unlikely that the seven-dimensional cluster would be so jointly encoded-the runlength is very high, and such a code is presented here for illustrative purposes only.

Coding using a Combination Code that Combines the Code of the 2D Non-Zero/Zero Cluster Coding Method and the Code of the Multi-Table Amplitude Coding Method Coding using a combination code that combines the position events of the 2-D Non-Zero/Zero Cluster Coding Method and the amplitude events of the Multi-Table Amplitude Coding Method to jointly code the position and amplitudes of clusters of non-zero-valued coefficients in the first (low-frequency) region includes identifying runs of zero-valued coefficients preceding runs (cluster) of non-zero-valued coefficients followed by a single zero-valued coefficient, then within a cluster of n consecutive non-zero coefficients, identifying events of a run of consecutive amplitude 1 coefficients followed by a single coefficient of amplitude greater than 1. Using | to separate such runs of zero preceding clusters of non-zeroes followed by a single zero, the low frequency region consists of, assuming a soft boundary, the region is:

|3 –1 1 1 –2 1 1 0|0 –1 2 1 0|1 –1 0|0 0 1 0|.

The code is:

$V_{R(z,n),C_7}$ {R(0,7),(0,3),(3,2),Exc}+S$_+$+S$_-$+S$_+$+S$_+$+S$_-$+
S$_+$+S$_+$+$V_{R(z,n),C_3}$ {R(1,3),(1,2,Exc}+S$_-$+S$_+$+S$_+$+
$V_{R(z,n),C_2}$ {R(0,2),Exc)}+S$_+$+S$_-$+$V_{R(z,n),C_1}$
{R(2,1),Exc}+S$_+$, where again, the signs are coded separately.

It should be noted that the examples above that use the Basic Multi-Dimensional Amplitude Coding Method are for illustrative purposes only. In practice, the size of the dimension for clustered amplitudes need to be limited to lower numbers such as 1, 2 and 3 for practical implementation.

Coding using a Combination Code that Combines the Code of the 2D Non-Zero/Zero Cluster Coding Method with the Code of the Multi-Dimensional Amplitude Coding Method for Short Clusters, and with the Code of the Multi-Table Amplitude Coding Method for Longer Clusters Coding using a combination code that combines the position event identification of the 2-D Non-Zero/Zero Cluster Coding Method with the amplitude events of the Basic Multi-Dimensional Amplitude Coding Method for short clusters, and with the amplitude events of the Multi-Table Amplitude Coding Method for longer clusters to jointly code the relative position and non-zero amplitudes of clusters of non-zero-valued coefficients in the first (low-frequency) region includes identifying runs of zero-valued coefficients preceding runs (cluster) of non-zero coefficients followed by a single zero-valued coefficient. The method further includes jointly encoding the relative position and the non-zero amplitudes with a multi-dimensional code for clusters of up to three non-zero coefficients, and, for each cluster of n>3 consecutive non-zero coefficients, identifying events of a run of consecutive amplitude 1 coefficients followed by a single coefficient of amplitude greater than 1, then jointly encoding the position event with the identified amplitude events. Using | to separate such runs of zero preceding clusters of non-zeroes followed by a single zero, the low frequency region consists of, assuming a soft boundary, the region is:

|3–1 1 1–2 1 1 0|0–1 2 1 0|1–1 0|0 0 1 0.

The code is:

$V_{R(z,n),C_7}\{R(0,7),(0,3),(3,2),Exc\}+S_++S_-+S_++S_++S_-+$
$S_++S_++V_{R(z,n),A_3}\{R(1,3),1,2,1\}+S_-+S_++S_++$
$V_{R(z,n),A_2}\{R(0,2),1,1\}+S_++S_-+V_{R(z,n),A_2}$
$\{R(2,1),1\}+S_+,$ where again, the signs are coded separately.

Note that for the first cluster of 7 non-zero coefficients, the amplitude event identifying of the Multi-Table Amplitude Coding Method is used, and then joint coding function of the position event and amplitude events is used, while for the other clusters of non-zero-valued coefficients, because the runlength of the cluster is three or less, the event identifying of the Basic Multi-Dimensional Amplitude Coding Method is used for the cluster, and a joint coding function of the position event and the amplitude event is used to obtain the complete codewords.

In an actual implementation, the inventors have noted that a maximal length can be defined for the clusters of non-zero amplitudes. Such use of maximal length is defined in the 2-D Non-Zero/Zero Cluster Coding Method.

Furthermore, in a practice, the inventors have found that because relatively low non-zero amplitude values such as 1 and 2 are so much more likely-to-occur than higher amplitude values such as 3, 4, 5, and so forth, and because the joint coding tables can become complex when there are many possible amplitude values, a practical implementation limits the amplitude values for clusters of non-zero-coefficients used in the joint encoding functions to relatively low amplitude values such as 1 and 2. Higher values such as 3, 4, 5, . . . are then encoded by separate position and amplitude codes as described, for example, in a combination of the 2-D Non-Zero/Zero Cluster Coding Method with the Basic Multi-Dimensional Amplitude Coding Method, or in a combination of the 2-D Non-Zero/Zero Cluster Coding Method with the Multi-Table Amplitude Coding Method. Because non-zero amplitude values of 1 and 2 are so much more likely-to-occur than the higher amplitudes, so limiting the amplitudes encoded by the joint encoding function should not affect the essential performance of the method too much.

How to establish the breakpoint is described in the Basic Hybrid Coding Method. One version uses a fixed breakpoint between the first, e.g., low frequency region, and the second, e.g., high frequency region. In one embodiment, the fixed breakpoint is pre-determined for each type of image and for each type of compression method by running experiments collecting statistics on a set of typical samples of such images. Typically, different breakpoints are determined for:

intraframe and still image coding vs. interframe coding;
standard definition television images (SDTV) vs. HDTV images;
high bit rate coding methods vs. low bit rate coding methods;
DCT vs. non-DCT transforms;
and so forth.

When fixed breakpoints are used, there is already an indication passed on to the decoder to indicate the type of image, e.g., whether interframe or intraframe. Thus, there is typically no need to send a further indication to the decoder of the breakpoint.

The inventors performed experiments on typical still images—applicable also to intraframe images in motion coding—by performing variable length coding according to embodiments of the present invention, and plotting the size of the compressed image for different breakpoint values for the case of 8 by 8 blocks quantized to 127 non-zero amplitudes using the DCT, and observed that a breakpoint of 22 worked for most images, although some images worked well with a breakpoint of about 12. Therefore, in one embodiment for intraframe and still images for DCT transform coding, a pre-selected fixed breakpoint of 22 was used.

In a first variation, the breakpoint is image dependent and selected from a finite set according to a breakpoint selection criterion. For example, from the above-described experiments, the compression using a first breakpoint of 22 was compared to the compression using a second breakpoint of 10, and the breakpoint that gave the higher compression was used. Other breakpoint selection criteria also are possible, e.g., by looking at the statistics of runs of zero-valued coefficients and non-zero-valued coefficients.

When such an image-dependent breakpoint is used, an indication of the breakpoint is also sent with each set of coefficients. In one embodiment, a 2-bit indication is sent. This provides for each block to be encoded using one of 4 pre-defined breakpoints. In an alternate embodiment, the indication of which pre-defined breakpoint is sent as a variable length code such that more common breakpoints are encoded by a shorter code.

While typically, the set of possible breakpoints is a small subset of the possible positions in the series, in yet another variation, the image dependent breakpoint is selected from anywhere in the series, or, in an alternate variation, from anywhere along a subrange.

In an improved embodiment, instead of the breakpoint defining a fixed boundary between the first and second region, called a "hard" boundary herein, or a set of breakpoints defining a set of hard breakpoints, such that an event or generalized event that includes a sequence of up to the maximal length of consecutive zero-valued coefficients followed by a run of non-zero values that crossed the breakpoint would be regarded as a generalized event in the first region up to the breakpoint. In such a case, the breakpoint defines what is called herein a "soft" boundary in that any event that started in the first region would be encoded in the first region even if it crossed the breakpoint. Thus, the actual boundary for a particular block of coefficients might extend beyond the breakpoint.

Thus, according to one method embodiment of the invention, one 2-D position code table is used to represent the runs of clustered zeros and clustered non-zero-valued coefficients that end in a single zero-valued coefficient, as described in the 2-D Non-Zero/Zero Cluster Coding Method, and a number of relatively short 2-D amplitude code tables, such a number denoted by "n," with the length of the tables ranging from 1 to n, are used to encode events that are each runs of amplitude-1 coefficients terminating in an amplitude greater than 1 within the cluster of n non-zero-valued coefficients.

The inventors have found that using such a method provides performance as good as or superior to the methods proposed in The Basic Hybrid VLC Method of above-mentioned incorporated-by-reference U.S. patent application Ser. No. 10/869,229 and the 2-D Non-Zero/Zero Cluster Coding Method of above-mentioned incorporated-by-reference U.S. patent application Ser. No. 10/922,508. It is also comparable to the Basic Multi-Dimensional Amplitude Coding Method of the above-mentioned incorporated-by-reference U.S. patent application Ser. No. 10/922,507 with the advantage of ease of implementation.

Apparatus

Figure 6:
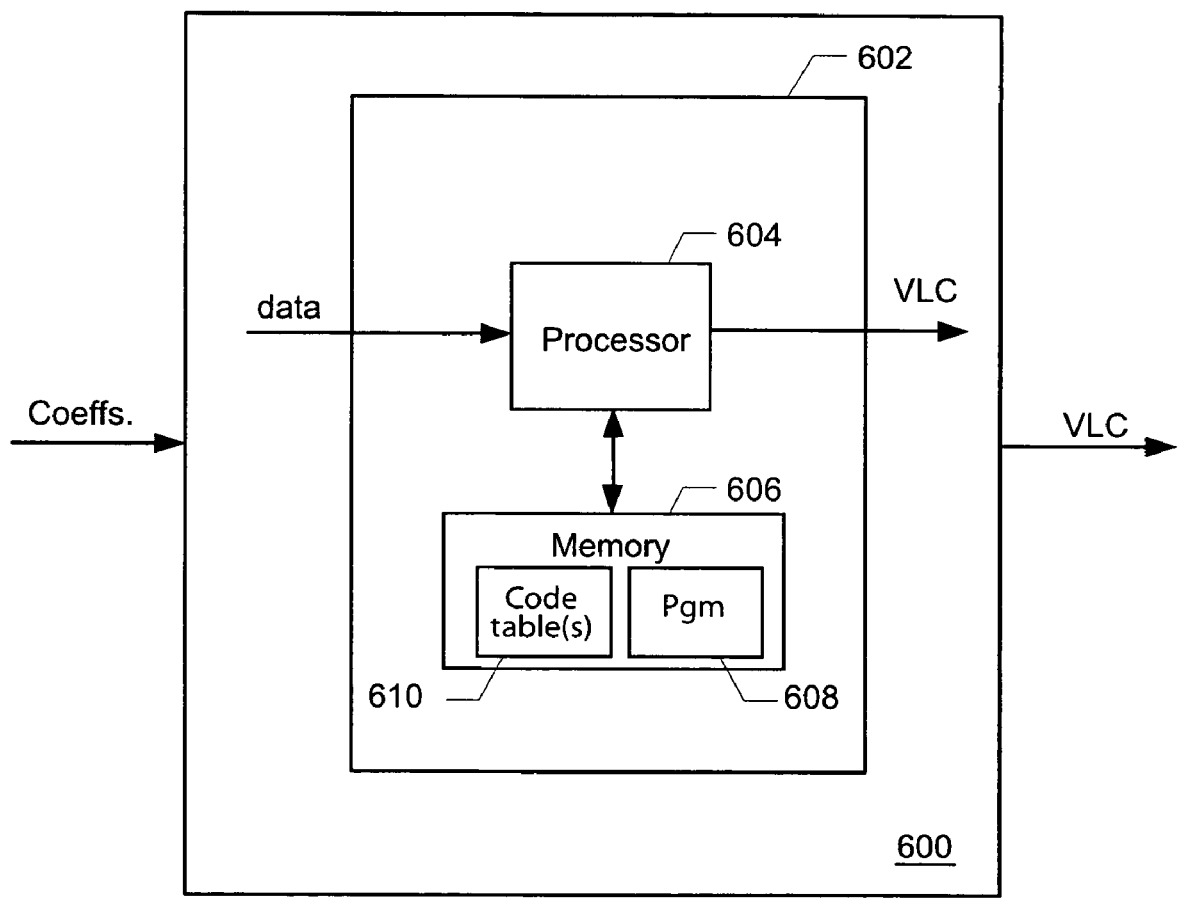
FIG. 6 shows an apparatus for coding a series of digital signals, e.g., an ordered series of quantized coefficients of a transformed block of image data, including a processing system that has a memory containing code that implements an embodiment of the coding method described herein.

Another aspect of the invention is an apparatus for coding a series of digital signals, e.g., an ordered series of quantized coefficients of a transformed block of image data. FIG. 6 shows an apparatus 600 that includes a processing system 602 that includes one or more processors 604 and a memory 606. A single processor is shown in FIG. 6 and those in the art will appreciate that this may represent several processors. Similarly, a single memory subsystem 606 is shown, and those in the art will appreciate that the memory subsystem may include different elements such as RAM, ROM, and so forth. In addition, the memory subsystem is meant to include any non-volatile memory storage such as a magnetic or optical storage component. A computer program 608 is included and is loaded into the memory 606. Note that at any time, some of the program may be in different parts of the memory subsystem, as will be understood by those in the art. The program 608 includes instructions to instruct the processor to implement, in different versions, the different coding methods described above. The processor thus accepts as data the ordered coefficients and generates the codewords. The apparatus 600 further includes in the memory subsystem 606 a coding data structure 610 that provides the codewords for sets of one or more coefficients as described in any one of the novel coding methods described herein. In one embodiment, the data structure is in the form of the coding tables for the position codes and for the amplitude codes, and for the joint coding function of position code and amplitude code.

Note that FIG. 6 does not show details such as bus structures, I/O structures, etc., that may be included since the need for such structures would be known to those in the art and their inclusion would only obscure the inventive aspects of the apparatus. Furthermore, the processing system may be implemented using one or more general purpose microprocessors, one or more microcontrollers that include several memory and other elements, one or more DSP devices, or any other programmable processors. Furthermore, the processors may be standalone devices, or may be implemented as "cores" to be included in an ASIC, gate array, or other device.

Another aspect of the invention is a memory (such as memory 606 in FIG. 6) that stores a coding data structure that provides the codewords for sets of one or more coefficients as described in any one of the novel coding methods described herein. In one embodiment, the data structure is in the form of one or more tables.

Thus, a variable length coding method and apparatus has been described suitable for encoding the quantized transform coefficients of blocks of images as occur in common image compression methods.

Another aspect of the invention is a method to decode a bitstream in order to form a series of quantized coefficients of a transform of a block of image data, the transform such that 0 is the most likely coefficient amplitude and 1 is the next most likely coefficient amplitude. The bitstream is encoded by the coding method described above including, for a first contiguous region in the series, identifying clusters of at least one non-zero-valued coefficients, and for each such cluster, identifying at least one position event to identify the relative position and runlength of the cluster of non-zero coefficients, and identifying at least one amplitude event to define the non-zero amplitudes in the cluster of non-zero coefficients.

The method further includes jointly coding the identified position event(s) and the identified amplitude event(s) such that relatively short codewords are formed to represent values or sequences of values that are relatively more likely-to-occur, and relatively long codewords are formed to represent values or sequences of values that are relatively less likely-to-occur. The method is applicable to encoding a region in the series where there is likely to be a cluster of non-zero-valued coefficients.

The decoding method includes recognizing a codeword, determining the event represented by the recognized codeword; and determining the sub-series of coefficients of each determined event, until all coefficients in the series are determined.

Figure 7:
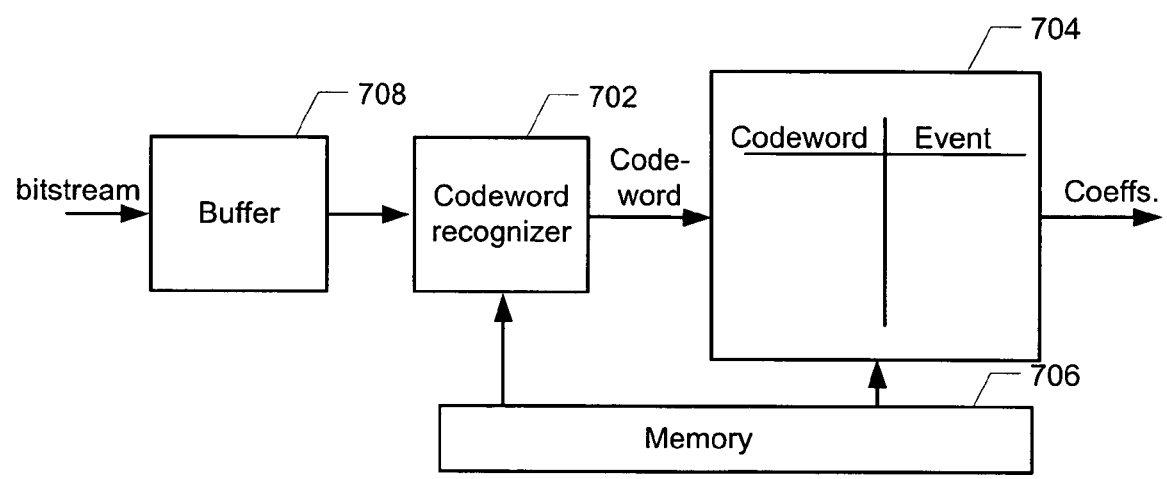
FIG. 7 shows an apparatus embodiment for decoding a bitstream representing series of codewords encoded according to one or more aspects of the present invention.

Another aspect of the invention is an apparatus for decoding a bitstream encoded by any of the methods described herein or in the Patent Applications described in the RELATED PATENT APPLICATIONS Section. FIG. 7 shows one embodiment of the apparatus. A codeword recognizer 702 accepts the bits of a bitstream and recognizes a codeword of a set of possible codewords that each represents an event. The codeword recognizer determines which of the five coding tables the codeword is from. A decoder 704 is coupled to the codeword recognizer 702 and determines the data for the codeword recognized by the codeword recognizer, e.g., the runlength of non-zeroes, the runlength of zeroes, the sign, etc. In one embodiment, the decoder 704 includes a lookup device that looks up the appropriate decoding table stored in a memory 706. That table provides the event for at least some of the codewords of the set of codewords. Other codewords may include an escape code, so that decoding is by other than a table lookup method. In one embodiment, the bitstream is stored in a buffer 708, and the output of the buffer is coupled to the codeword recognizer.

While in the embodiment shown in FIG. 7, the memory is shown separate from the lookup device, those in the art will understand that in other embodiments, the lookup device includes memory for the tables, and such other embodiments are included herein.

Note further that in FIG. 7, the codeword recognizer and also the lookup device may be each implemented on a computer as a set of instructions stored in a memory, e.g., the memory 706, that instruct one or more processors to carry out the operations of the recognition and of the lookup.

Another aspect of the invention is a memory (such as memory 706 in FIG. 7) that stores a decoding data structure that provides the data for any set of codewords recognized in a bitstream of compressed image data. The bitstream is coded by any one of the novel coding methods described herein. In one embodiment, the data structure is in the form of one or more tables.

The coding and decoding methodologies described herein are, in one embodiment, performable by a machine which includes a one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, one typical machine may be exemplified by a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein also encompasses a storage system such as a disk drive unit. The processing system in some configurations may include a sounds output device, and a network interface device. The memory subsystem thus includes a carrier medium that carries machine readable code segments (e.g., software) including instructions for performing, when executed by the processing system, one of more of the methods described herein. The software may reside in the hard disk, or may also reside, completely or at least partially, within the RAM and/or within the processor during execution thereof by the computer system. Thus, the memory and the processor also constitute carrier medium carrying machine readable code.

In alternative embodiments, the machine operates as a standalone device or may be connected, e.g., networked to other machines, in a networked deployment, the machine may operate in the capacity of a server or a client machine in a server-client network environment, or as a peer machine in a peer-to-peer or distributed network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer program that executes on a processing system, e.g., one or more processors that are part of an image encoder. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries one or more computer readable code segments for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code segments embodied in the medium.

The software may further be transmitted or received over a network via the network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by the machine and that cause the machine to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to include, but not be limited to, solid-state memories, optical and magnetic media, and carrier wave signals.

It will be understood that the steps of methods discussed are performed in one embodiment by an appropriate processor (or processors) of a processing (i.e., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

It should further be appreciated that although the invention has been described in the context of transform encoding of images, the invention is not limited to such contexts and may be utilized in various other compression applications and systems. Furthermore, the invention is not limited to any one type of architecture or type of transform encoding. For example, the DCT is mentioned above as one transform. Other transforms may be used, e.g., the new H.264/MEG-4 AVC video coding standard/draft standard defines 4×4 blocks and a DCT-like 4×4 integer transform. The invention does not depend on any particular type of interframe coding if used, or of motion compensation if used for interframe coding, or any intra-estimation if used for estimating the pixels of a block using information from neighboring blocks.

Note that variable length coding is sometimes referred to as entropy coding or statistical coding.

Note that in one embodiment for amplitude encoding, 127 possible non-zero values are possible for the coefficients. The invention however is not restricted to any number of possible quantization values.

Note also that the term amplitude is irrespective of sign. Therefore, for example, coefficient of values +1 and −1 both have amplitude 1.

Note that the terms coding and encoding are used interchangeably herein.

Note also that the present invention does not depend on the particular type of VLC used for any of the coding methods, e.g., the coding tables, and can work, for example, with Huffman coding and with arithmetic coding methods. Furthermore, while embodiments have been described that used fixed encoding for the events based on assumed or a priori likelihoods of occurrence of the events (also called the symbols), i.e., the likelihoods of occurrence of the events do not change, other embodiments use adaptive encoding, i.e., the encoding is changeable according to statistical data such as histograms collected from the actual coefficients.

All publications, patents, and patent applications cited herein are hereby incorporated by reference.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. Thus, the scope of the expression a device A coupled to a device B should not be limited to devices or systems wherein an output of device A is directly connected to an input of device B. It means that there exists a path between an output of A and an input of B which may be a path including other devices or means.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A method of processing, using hardware that may include one or more processors, the processing being of an ordered series of digital signals that each have a respective value including a respective amplitude from a finite set of amplitudes consisting of the most likely-to-occur amplitude and at least one other amplitude, the at least one other amplitude including a next most likely-to-occur amplitude to the most likely-to-occur amplitude, the processing to reduce the amount of data used to represent the digital signals and to form codewords such that the relatively more likely-to-occur values or sequences of values of digital signals are represented by relatively short codewords and the relatively less likely-to-occur values or sequences of values of digital signals are represented by relatively long codewords, the method comprising:

for a first contiguous region in the series:
identifying clusters that each include one or more consecutive signals having any amplitude other than the most likely-to-occur amplitude, and any intervening runs of consecutive signals having the most likely-to-occur value;
for each identified cluster of signals having any amplitude other than the most likely-to-occur amplitude:
identifying at least one position event to define the relative positions and runlengths of the identified cluster of signals having any amplitude other than the most likely-to-occur amplitude, and any intervening runs of consecutive coefficients having the most likely-to-occur value;
identifying at least one amplitude event, the identified amplitude events defining the amplitudes of the signals in the identified cluster of consecutive signals having amplitudes other than the most likely-to-occur amplitude; and
jointly encoding the identified position events and the identified amplitude events to jointly encode relative position and the amplitudes of the consecutive signals having amplitude other than the most likely-to-occur amplitude, the jointly encoding being according to a multi-dimensional coding function of the position event and of the amplitude event, the jointly encoding arranged such that relatively short codewords are used to represent the relative positions and amplitudes of clusters that are more likely-to-occur, and relatively long codewords are used to represent the relative positions and amplitudes of clusters that are relatively less likely-to-occur.

2. A method as recited in claim 1, wherein the series of digital signals is a series of quantized coefficients of a transformed block of image data formed by a transform such that the most likely-to-occur amplitude is 0, and the next most likely-to-occur amplitude is 1, such that the identifying of clusters identifies clusters that each include at least one consecutive non-zero-valued coefficients.

3. A method as recited in claim 2, wherein the transformed block of image data includes a DC term, and wherein the DC term is separately encoded, such that the series of digital signals is a set of non-DC quantized coefficients of a transformed block of image data.

4. A method as recited in claim 2,
wherein the identifying of position events identifies a run of consecutive zero-valued coefficients preceding a run of one or more consecutive non-zero-valued coefficients followed by a single zero-valued coefficient, or identifies that there are no zero-valued coefficients preceding a run of one or more consecutive non-zero-valued coefficients followed by a single zero-valued coefficient; and
wherein the joint encoding jointly encodes the runlengths of the preceding run of zero-valued coefficients, the runlength of the following run of non-zero-valued coefficients, and the amplitude events, such that for at least some combinations of runlengths and amplitude events, relatively more likely-to-occur combinations are encoded by a shorter codeword than relatively less likely-to-occur combinations.

5. A method as recited in claim 2, wherein the joint encoding includes separately encoding the signs of the amplitudes in the cluster and jointly encoding the position events and of the amplitude events.

6. A method as recited in claim 2, wherein the joint encoding includes separately encoding the signs of the amplitudes in the cluster and jointly encoding the position events and of the amplitude events.

7. A method as recited in claim 2, wherein the identified amplitude event for each cluster is the set of non-zero-amplitudes of the coefficients in the cluster of non-zero-amplitudes, such that the joint encoding jointly encodes the position events with a plurality of consecutive non-zero amplitudes in the cluster of consecutive non-zero-valued coefficients.

8. A method as recited in claim 2, wherein the identifying amplitude events includes:
in each identified cluster, identifying amplitude events of at least one consecutive coefficient including a sequence of at least one consecutive coefficient having amplitude-1 that ends in a coefficient having an amplitude greater than 1, or ascertaining that the event has only an amplitude greater than 1, or ascertaining that the event has only a sequence of consecutive coefficients having an amplitude of 1, each identified event for the runlength of the identified cluster defined by the length of the sequence of at least one consecutive amplitude-1 coefficient, and by the amplitude of the ending coefficient.

9. A method as recited in claim 8, wherein the joint encoding of the identified position and amplitude events uses a multidimensional coding table that provides a codeword for the combination of the position code and the pairs of runlengths of the sequence of preceding amplitude-1 coefficients and the amplitude of the ending coefficient of amplitude greater than 1.

10. A method as recited in claim 2, wherein the identifying amplitude events includes:
for each identified cluster of a length less than or equal to a pre-selected length, identifying the consecutive non-zero amplitudes in the cluster of consecutive non-zero-valued coefficients, such that the joint encoding is according to a multidimensional coding method jointly encodes the position event or events and the non-zero amplitudes; and
for each identified cluster of a length greater then the pre-selected length:
identifying amplitude events of at least one consecutive coefficient including a sequence of at least one consecutive coefficient having amplitude-1 that ends in a coefficient having an amplitude greater than 1, or ascertaining that the event has only an amplitude greater than 1, or ascertaining that the event has only a sequence of consecutive coefficients having an amplitude of 1, each identified event for the runlength of the identified cluster defined by the length of the sequence of at least one consecutive amplitude-1 coefficient, and by the amplitude of the ending coefficient; and
jointly encoding the identified position event or events and amplitude event of events event according to a multidimensional coding method that jointly encodes the position event or events and the amplitude event or events.

11. A method as recited in claim 4, further comprising:
providing a breakpoint to define the first contiguous region along the ordering of the series followed by a second continuous region; such that the coefficients of the first region are encoded by a first encoding method that includes the identifying of clusters, the encoding the relative positions and runlength, the encoding of the amplitudes of the consecutive coefficients, and the jointly encoding; and
encoding the coefficients in the second region using a second region encoding method, and
wherein a first region encoding method and the second region encoding method are such that the encoding of at least some of the coefficients or runs of coefficients in the first region is different than the encoding of at least some of the coefficients or runs of coefficients in the second region.

12. A computer readable hardware medium configured with instructions for performing, when executed by a processor, a method for processing an ordered series of digital signals that each have a respective value including a respective amplitude from a finite set of amplitudes consisting of the most likely-to-occur amplitude and at least one other amplitude, the processing to reduce the amount of data used to represent the digital signals and to form codewords such that the more likely-to-occur values or sequences of values of digital signals are represented by relatively short codewords and the less likely-to-occur values or sequences of values of digital signals are represented by relatively long codewords, the method comprising:
for a first contiguous region in the series:
identifying clusters that each include one or more consecutive signals having any amplitude other than the most likely-to-occur amplitude, and any intervening runs of consecutive signals having the most likely-to-occur value;
for each identified cluster of signals having any amplitude other than the most likely-to-occur amplitude:
identifying at least one position event to define the relative positions and runlengths of the identified cluster of signals having any amplitude other than the most likely-to-occur amplitude, and any intervening runs of consecutive coefficients having the most likely-to-occur value;
identifying at least one amplitude event, the identified amplitude events defining the amplitudes of the signals in the identified cluster of consecutive signals having amplitudes other than the most likely-to-occur amplitude; and
jointly encoding the identified position events and the identified amplitude events to jointly identify relative position and the amplitudes of the consecutive signals having amplitude other than the most likely-to-occur amplitude, the jointly encoding being according to a multi-dimensional coding function of the position event and of the amplitude event, the jointly encoding arranged such that relatively short codewords are used to represent the relative positions and amplitudes of clusters that are more likely-to-occur, and relatively long codewords are used to represent the relative positions and amplitudes of clusters that are relatively less likely-to-occur.

13. A computer readable hardware medium as recited in claim 12,
wherein the series of digital signals is a series of quantized coefficients of a transformed block of image data formed by a transform such that the most likely-to-occur amplitude is 0, and the next most likely-to-occur amplitude is 1, such that the identifying of clusters identifies clusters that each include at least one consecutive non-zero-valued coefficients.

14. A computer readable hardware medium as recited in claim 13,
wherein the identifying of position events identifies a run of consecutive zero-valued coefficients preceding a run of one or more consecutive non-zero-valued coefficients followed by a single zero-valued coefficient, or identifies that there are no zero-valued coefficients preceding a run of one or more consecutive non-zero-valued coefficients followed by a single zero-valued coefficient; and
wherein the joint encoding jointly encodes the runlengths of the preceding run of zero-valued coefficients, the runlength of the following run of non-zero-valued coefficients, and the amplitude events, such that for at least some combinations of runlengths and amplitude events, relatively more likely-to-occur combinations are encoded by a shorter codeword than relatively less likely-to-occur combinations.

15. A computer readable hardware medium as recited in claim 13,
wherein the identified amplitude event for each cluster is the set of non-zero-amplitudes of the coefficients in the cluster of non-zero-amplitudes, such that the joint encoding jointly encodes the position events with a plurality of consecutive non-zero amplitudes in the cluster of consecutive non-zero-valued coefficients.

16. A computer readable hardware medium as recited in claim 13, wherein the identifying amplitude events includes:
in each identified cluster, identifying amplitude events of at least one consecutive coefficient including a sequence of at least one consecutive coefficient having amplitude-1 that ends in a coefficient having an amplitude greater than 1, or ascertaining that the event has only an amplitude greater than 1, or ascertaining that the event has only a sequence of consecutive coefficients having an amplitude of 1, each identified event for the runlength of the identified cluster defined by the length of the sequence of at least one consecutive amplitude-1 coefficient, and by the amplitude of the ending coefficient.

17. An apparatus for processing an ordered series of digital signals that each have a respective value including a respective amplitude from a finite set of amplitudes consisting of the most likely-to-occur amplitude and at least one other amplitude, the processing to reduce the amount of data used to represent the digital signals and to form codewords such that the more likely-to-occur values or sequences of values of digital signals are represented by relatively short codewords and the less likely-to-occur values or sequences of values of digital signals are represented by relatively long codewords, the apparatus comprising:
means for identifying clusters that each include one or more consecutive signals having any amplitude other than the most likely-to-occur amplitude, and any intervening runs of consecutive signals having the most likely-to-occur value;
for each identified cluster of signals having any amplitude other than the most likely-to-occur amplitude:
means for identifying position events to encode the relative positions and runlength for each identified cluster of signals having any amplitude other than the most likely-to-occur amplitude, and any intervening runs of consecutive coefficients having the most likely-to-occur value;
means for identifying amplitude events to, the identified amplitude events defining the amplitudes of the signals in the identified cluster of consecutive signals having amplitudes other than the most likely-to-occur amplitude; and
means for jointly encoding the identified position events and the identified amplitude events to jointly encode relative position and the amplitudes of the consecutive signals having amplitude other than the most likely-to-occur amplitude, the means for jointly encoding using a multi-dimensional coding function of the position event and of the amplitude event, and arranged such that relatively short codewords are used to represent the relative positions and amplitudes of clusters that are more likely-to-occur, and relatively long codewords are used to represent the relative positions and amplitudes of clusters that are relatively less likely-to-occur.

18. An apparatus as recited in claim 17,
wherein the series of digital signals is a series of quantized coefficients of a transformed block of image data formed by a transform such that the most likely-to-occur amplitude is 0, and the next most likely-to-occur amplitude is 1, such that the identifying of clusters identifies clusters that each include at least one consecutive non-zero-valued coefficients.

19. An apparatus as recited in claim 18, wherein the amplitude encoding means includes means for separately encoding the signs of the amplitudes in the cluster, and wherein the two dimensional coding function is a function of the position codewords and of a combination of the amplitude codewords and encoding of the signs.

20. An apparatus as recited in claim 18, wherein the means for identifying amplitude events identifies the non-zero amplitudes in each cluster of consecutive non-zero-valued coefficients, such that the means for joint encoding jointly encodes the identified position event or events with the non-zero amplitudes in the cluster of consecutive non-zero-valued coefficients using a multidimensional coding method.

21. An apparatus as recited in claim 18,
wherein the means for identifying amplitude events in each identified cluster identifies events of at least one consecutive coefficient including a sequence of at least one consecutive coefficient having amplitude-1 that ends in a coefficient having an amplitude greater than 1, or ascertains that the event has only an amplitude greater than 1, or ascertains that the event has only a sequence of consecutive coefficients having an amplitude of 1, each identified event for the runlength of the identified cluster defined by the length of the sequence of at least one consecutive amplitude-1 coefficient, and by the amplitude of the ending coefficient; and
wherein the means for jointly encoding jointly encodes the identified position event or events with the identified amplitude event or events that are each defined by the runlength of any consecutive amplitude-1 coefficients that precede a coefficient of greater amplitude than 1 and the amplitude of the ending coefficient, or the runlength of amplitude-1 coefficients when the event consists only of amplitude-1 coefficients.

22. An apparatus including a processing system, the processing system including a computer-readable hardware medium containing instructions that when executed cause the apparatus to accept an ordered series of digital signals that each have a respective value including a respective amplitude from a finite set of amplitudes consisting of the most likely-to-occur amplitude and at least one other amplitude, the instructions when executed further causing the apparatus to perform a method for processing an ordered series of digital signals to reduce the amount of data used to represent the digital signals and to form codewords such that the more likely-to-occur values or sequences of values of digital signals are represented by relatively short codewords and the less likely-to-occur values or sequences of values of digital signals are represented by relatively long codewords, the method comprising:

for a first contiguous region in the series:
identifying clusters that each include one or more consecutive signals having any amplitude other than the most likely-to-occur amplitude, and any intervening runs of consecutive signals having the most likely-to-occur value;
for each identified cluster of signals having any amplitude other than the most likely-to-occur amplitude:
identifying at least one position event to define the relative positions and runlengths of the identified cluster of signals having any amplitude other than the most likely-to-occur amplitude, and any intervening runs of consecutive coefficients having the most likely-to-occur value;
identifying at least one amplitude event, the identified amplitude events defining the amplitudes of the signals in the identified cluster of consecutive signals having amplitudes other than the most likely-to-occur amplitude; and
jointly encoding the identified position events and the identified amplitude events to jointly encode relative position and the amplitudes of the consecutive signals having amplitude other than the most likely-to-occur amplitude, the jointly encoding being according to a multi-dimensional coding function of the position event and of the amplitude event, the jointly encoding arranged such that relatively short codewords are used to represent the relative positions and amplitudes of clusters that are more likely-to-occur, and relatively long codewords are used to represent the relative positions and amplitudes of clusters that are relatively less likely-to-occur.

23. An apparatus as recited in claim 22,
wherein the series of digital signals is a series of quantized coefficients of a transformed block of image data formed by a transform such that the most likely-to-occur amplitude is 0, and the next most likely-to-occur amplitude is 1, such that the identifying of clusters identifies clusters that each include at least one consecutive non-zero-valued coefficients.

* * * * *